US010170011B2

(12) United States Patent
Castelli et al.

(10) Patent No.: US 10,170,011 B2
(45) Date of Patent: Jan. 1, 2019

(54) GUIDE DRONES FOR AIRPLANES ON THE GROUND

(71) Applicant: International Business Machines Corporation, Armonk, NY (US)

(72) Inventors: Vittorio Castelli, Croton on Hudson, NY (US); Georgiana Dinu, White Plains, NY (US); Radu Florian, Danbury, CT (US); Avirup Sil, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 206 days.

(21) Appl. No.: 15/220,166

(22) Filed: Jul. 26, 2016

(65) Prior Publication Data
US 2018/0033320 A1    Feb. 1, 2018

(51) Int. Cl.
*G08G 5/06* (2006.01)
*G05D 1/00* (2006.01)
(Continued)

(52) U.S. Cl.
CPC .............. *G08G 5/065* (2013.01); *B62D 63/02* (2013.01); *B64C 39/024* (2013.01); *B64D 47/08* (2013.01);
(Continued)

(58) Field of Classification Search
CPC ......... G05D 1/0083; G05D 2201/0207; G08G 5/065; G08G 1/0955; G08G 5/045; B64C 25/405; B64C 39/024; B64F 5/60
See application file for complete search history.

(56) References Cited

U.S. PATENT DOCUMENTS 4,757,481 A * 7/1988 Orr .................. G01S 7/003
                                                       367/95
5,521,817 A    5/1996 Burdoin et al.
(Continued)

FOREIGN PATENT DOCUMENTS

AU      2014100500 A4    6/2014
CN         1648962 A  *  8/2005
(Continued)

OTHER PUBLICATIONS

EPO machine translation of FR 3007176 (original FR document published Dec. 19, 2014) (Year: 2014).*
(Continued)

*Primary Examiner* — Behrang Badii
*Assistant Examiner* — David A Testardi
(74) *Attorney, Agent, or Firm* — Amin, Turocy & Watson, LLP

(57) ABSTRACT

Techniques for drone device control are provided. In one example, a computer-implemented method comprises: meeting, by a drone device operatively coupled to a processor, an aircraft at a first location; and guiding, by the drone device, the aircraft to a second location along a ground movement path selected from a plurality of ground movement paths associated with an airport. The guiding can comprise providing a direction indication to the aircraft; and monitoring a defined region around the aircraft for one or more hazards. The guiding can also comprise, in response to identifying a hazard from the one or more hazards related to the defined region around the aircraft, providing a hazard indication to the aircraft.

20 Claims, 14 Drawing Sheets

(51) Int. Cl.
*B64F 5/60* (2017.01)
*G08G 5/04* (2006.01)
*B64C 39/02* (2006.01)
*B64D 47/08* (2006.01)
*B62D 63/02* (2006.01)
*G08G 5/00* (2006.01)
*B63G 8/00* (2006.01)

(52) U.S. Cl.
CPC ............ *B64F 5/60* (2017.01); *G05D 1/0083* (2013.01); *G08G 5/0008* (2013.01); *G08G 5/0021* (2013.01); *G08G 5/0069* (2013.01); *G08G 5/0078* (2013.01); *G08G 5/045* (2013.01); *B63G 2008/005* (2013.01); *B64C 2201/12* (2013.01)

(56) References Cited

U.S. PATENT DOCUMENTS

| | | | |
|---|---|---|---|
| 6,439,162 | B1 | 8/2002 | van den Berg |
| 7,866,865 | B2 | 1/2011 | Wu |
| 8,229,604 | B2 | 7/2012 | Villaume et al. |
| 8,265,808 | B2 | 9/2012 | Garrec et al. |
| 8,314,695 | B2 | 11/2012 | Greenberg |
| 8,770,808 | B1 | 7/2014 | Campbell et al. |
| 8,880,241 | B2 | 11/2014 | Mohamadi |
| 8,913,783 | B2 | 12/2014 | Khan et al. |
| 9,057,609 | B2 | 6/2015 | Yu et al. |
| 9,170,117 | B1* | 10/2015 | Abuelsaad ............ G01C 21/34 |
| 9,651,945 | B1 | 5/2017 | Erickson et al. |
| 2005/0240323 | A1* | 10/2005 | Orita .................... B62D 15/027 701/28 |
| 2006/0074557 | A1* | 4/2006 | Mulligan ............. G05D 1/0094 701/13 |
| 2008/0099600 | A1* | 5/2008 | Perry .................... B64C 39/024 244/70 |
| 2010/0063650 | A1* | 3/2010 | Vian ....................... B64F 5/60 701/2 |
| 2010/0180420 | A1 | 7/2010 | Radgens |
| 2011/0015816 | A1* | 1/2011 | Dow .................... G01C 21/20 701/23 |
| 2011/0208373 | A1* | 8/2011 | Lees ..................... B64C 39/024 701/2 |
| 2011/0259995 | A1* | 10/2011 | Frings ....................... B64F 1/22 244/50 |
| 2012/0044710 | A1* | 2/2012 | Jones ................... B64C 39/024 362/470 |
| 2012/0081540 | A1* | 4/2012 | Jang ....................... B64F 5/0045 348/128 |
| 2013/0100693 | A1 | 4/2013 | Rogers |
| 2013/0340305 | A1 | 12/2013 | Mobley |
| 2014/0249736 | A1* | 9/2014 | Beda ........................ G08G 5/065 701/120 |
| 2014/0309853 | A1 | 10/2014 | Ricci |
| 2015/0127209 | A1 | 5/2015 | Al-Gami et al. |
| 2015/0251591 | A1 | 9/2015 | Lu |
| 2015/0353206 | A1 | 12/2015 | Wang |
| 2015/0370251 | A1 | 12/2015 | Siegel et al. |
| 2016/0070261 | A1 | 3/2016 | Heilman et al. |
| 2016/0071421 | A1* | 3/2016 | Bousquet ............ G08G 5/0047 701/467 |
| 2016/0129999 | A1* | 5/2016 | Mays .................... B64C 39/024 701/2 |
| 2016/0157414 | A1* | 6/2016 | Ackerman ........... A01B 69/008 701/25 |
| 2016/0264262 | A1* | 9/2016 | Colin ....................... B25J 5/007 |
| 2016/0272317 | A1* | 9/2016 | Cho ........................ G08G 1/09 |
| 2016/0378109 | A1* | 12/2016 | Raffa .................... G05D 1/0038 701/2 |
| 2016/0378895 | A1* | 12/2016 | Gnecco .................... B64F 5/60 701/2 |
| 2017/0127652 | A1 | 5/2017 | Shen et al. |
| 2017/0154524 | A1* | 6/2017 | Beaulieu ............. G08G 1/0955 |
| 2017/0199520 | A1* | 7/2017 | Glatfelter ............ G05D 1/0011 |
| 2017/0202185 | A1 | 7/2017 | Trumbull et al. |
| 2018/0170540 | A1* | 6/2018 | Claybrough ......... G05D 1/0094 |

FOREIGN PATENT DOCUMENTS

| | | | | |
|---|---|---|---|---|
| CN | 103782914 | A | 5/2014 | |
| CN | 203689138 | U | 7/2014 | |
| CN | 104156821 | A | 11/2014 | |
| CN | 204095648 | U | 1/2015 | |
| CN | 105248308 | A | 1/2016 | |
| DE | 19900333 | A1* | 7/2000 | ............ B61L 23/041 |
| FR | 3007176 | A1* | 12/2014 | |
| JP | 08083394 | A* | 3/1996 | |
| KR | 1020150100589 | A | 9/2015 | |
| WO | 2010057266 | A1 | 5/2010 | |
| WO | WO-2014/080388 | A2* | 5/2014 | |
| WO | 2015068864 | A1 | 5/2015 | |
| WO | 2015187172 | A1 | 12/2015 | |
| WO | 2015188831 | A1 | 12/2015 | |
| WO | WO-2017/153912 | A1* | 9/2017 | |

OTHER PUBLICATIONS

Humphrey, Laura R., "Model checking for verification in UAV cooperative control applications", appearing as Chapter 4 in F. Fahroo et al. (Eds.): Recent Adv. in Res. on Unmanned Aerial Veh., LNCIS 444, 2013, pp. 69-117. (Year: 2013).*

Morris, Robert et al., "Self-driving aircraft towing vehicles—a preliminary report", Artificial Intelligence for Transportation: Advice, Interactivity and Actor Modeling: Papers from the 2015 AAAI Workshop, pp. 41-48. (Year: 2015).*

Skybrary, "Follow Me Vehicle Procedure", 5 pages, last modified on May 30, 2016, downloaded from: https://www.skybrary.aero/index. php/Follow_Me_Vehicle_Procedures (Year: 2016).*

Kanisstras, K., et al., "Survey of Unmanned Aerial Vehicles (UAVs) for Traffic Monitoring," Handbook of Unmanned Aerial Vehicles, 2015, pp. 2643-2666.

Jackson, M. R. C., et al., "Airborne Technology for Distributed Air Traffic Management," Proceedings of the 44th IEEE Conference on Decision and Control, and the European Control Conference, 2005, pp. 3947-3954.

U.S. Appl. No. 14/930,806, "Dynamic Management System, Method, and Recording Medium for Cognitive Drone-Swarms," filed Nov. 3, 2015, 29 pages.

List of IBM Patents or Applications Treated as Related. (U.S. Appl. No. 14/930,806, filed Nov. 3, 2015).

Garling, "Drone, Drone on the Range," Modern Farmer, Jul. 8, 2013, 4 pages, http://modernfarmer.com/2013/07/drones-drones-on-the-range/.

Hudson, "Drone technology makes mustering easy in North otago video," Nov. 9, 2015, 4 pages, http://www.stuff.co.nz/business/farming/agribusiness/73454308/Drone-technology-makes-mustering-easy-in-North-otago.

Lenkaitis, "Livestock flight zone research lays groundwork for drone use," Progressive Dairyman, Sep. 11, 2015, 5 pages, http://www.progressivedairy.com/topics/barns-equipmentllivestock-flight-zone-research-lays-groundwork-for-drone-use.for-drone-use.

Non-Final office action received for U.S. Appl. No. 15/223,358, dated Sep. 12, 2017, 24 pages.

Rear position lamps (tail lamps), from Automotive Lighting, Last edited Jun. 7, 2016, https://en.wikipedia.org/wiki/Automotive_lighting#Rear_position_lamps.28tail_iamps.29, 1 page.

Non-Final office action received for U.S. Appl. No. 14/930,806, dated Nov. 10, 2016, 24 pages.

Notice of Allowance received for U.S. Appl. No. 14/930,806, dated Jan. 18, 2017, 11 pages.

Mell, et al. "The NIST Definition of Cloud Computing". Recommendations of the National Institute of Standards and Technology, 7 pages, (Sep. 2011).

Non-Final Office Action for U.S. Appl. No. 15/418,826 dated May 2, 2018, 12 pages.

(56) References Cited

OTHER PUBLICATIONS

Non-Final office action received for U.S. Appl. No. 15/223,351, dated May 31, 2018, 46 pages.
Office Action for U.S. Appl. No. 15/418,826 dated Jun. 29, 2018, 9 pages.

* cited by examiner

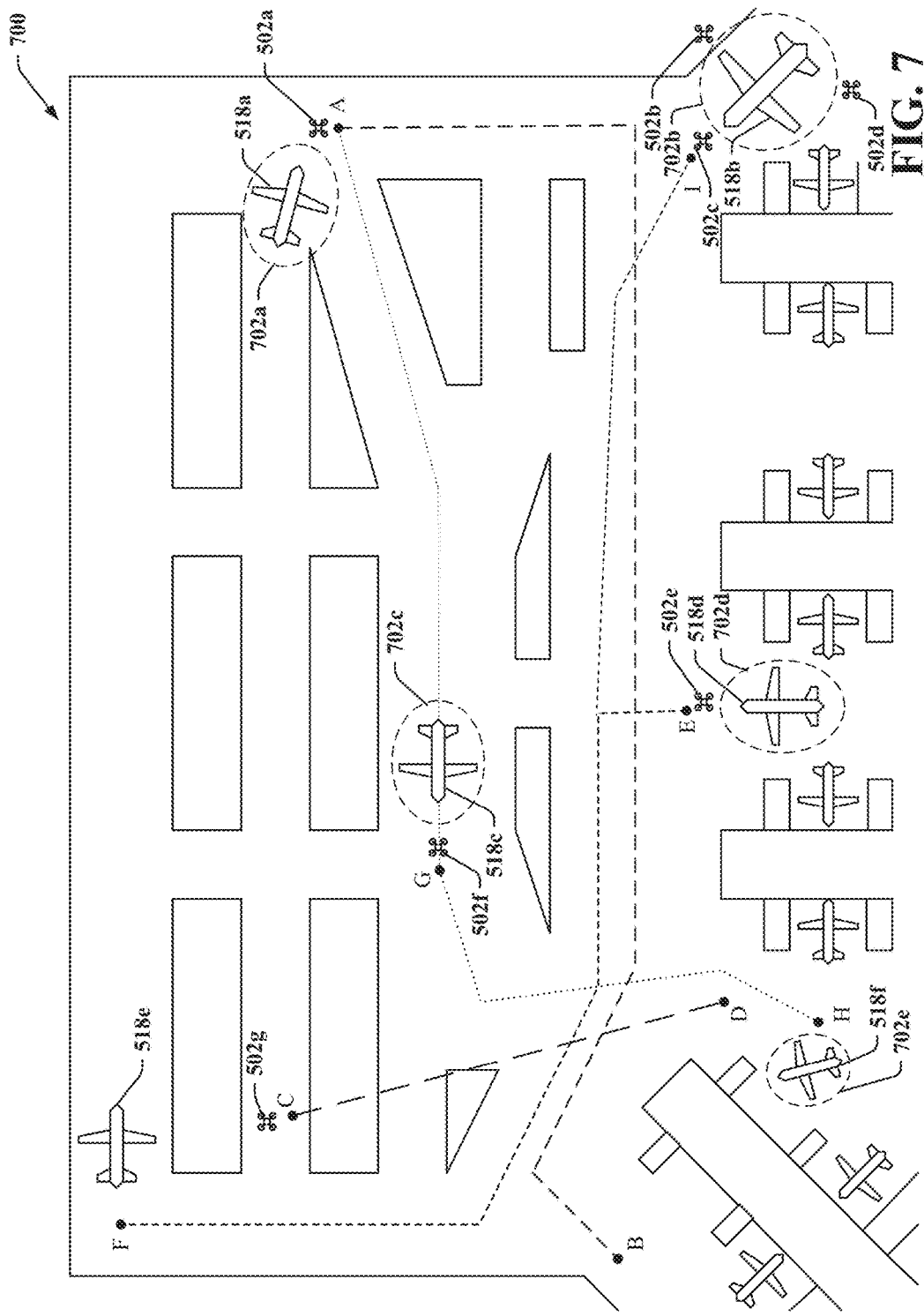

GUIDE DRONES FOR AIRPLANES ON THE GROUND

The subject disclosure relates to employing one or more drones to guide an airplane on the ground.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate employing one or more drones to guide an airplane on the ground are described.

According to an embodiment, a computer-implemented method can comprise meeting, by a drone device operatively coupled to a processor, an aircraft at a first location. The computer-implemented method can also comprise guiding, by the drone device, the airplane to a second location along a ground movement path selected from a plurality of ground movement paths associated with an airport. The guiding can comprise providing a direction indication to the aircraft, and monitoring a defined region around the aircraft for one or more hazards. The guiding can also comprise, in response to identifying a hazard from the one or more hazards related to the defined region around the aircraft, providing a hazard indication to the aircraft.

According to another embodiment, a drone device is provided. The drone device can comprise a memory that stores computer executable components. The drone device can also comprise a processor that executes the computer executable components stored in the memory. The computer executable components can comprise an assignment component that determines an assignment of an aircraft to the drone device. The computer executable components can also comprise a guidance component that causes the drone device to perform a first action to guide the aircraft to traverse a ground movement path from a starting location to an ending location.

According to yet another embodiment, a computer program product for guiding an aircraft is provided. The computer program product comprising a computer readable storage medium having program instructions embodied therewith, the program instructions executable by a drone device to cause the drone device to receive first data comprising an assignment of an aircraft to the drone device, receive second data comprising a first ground movement path for the aircraft between a first location and a second location, move to a position relative to the aircraft at the first location, inspect the aircraft for a first hazard, and in response to identification of the first hazard, perform a first action related to mitigation of the first hazard.

DESCRIPTION OF THE DRAWINGS

FIG. 7 illustrates a block diagram of a non-limiting example airport depicting drone devices guiding aircraft in accordance with one or more embodiments described herein.

DETAILED DESCRIPTION

Figure 1:
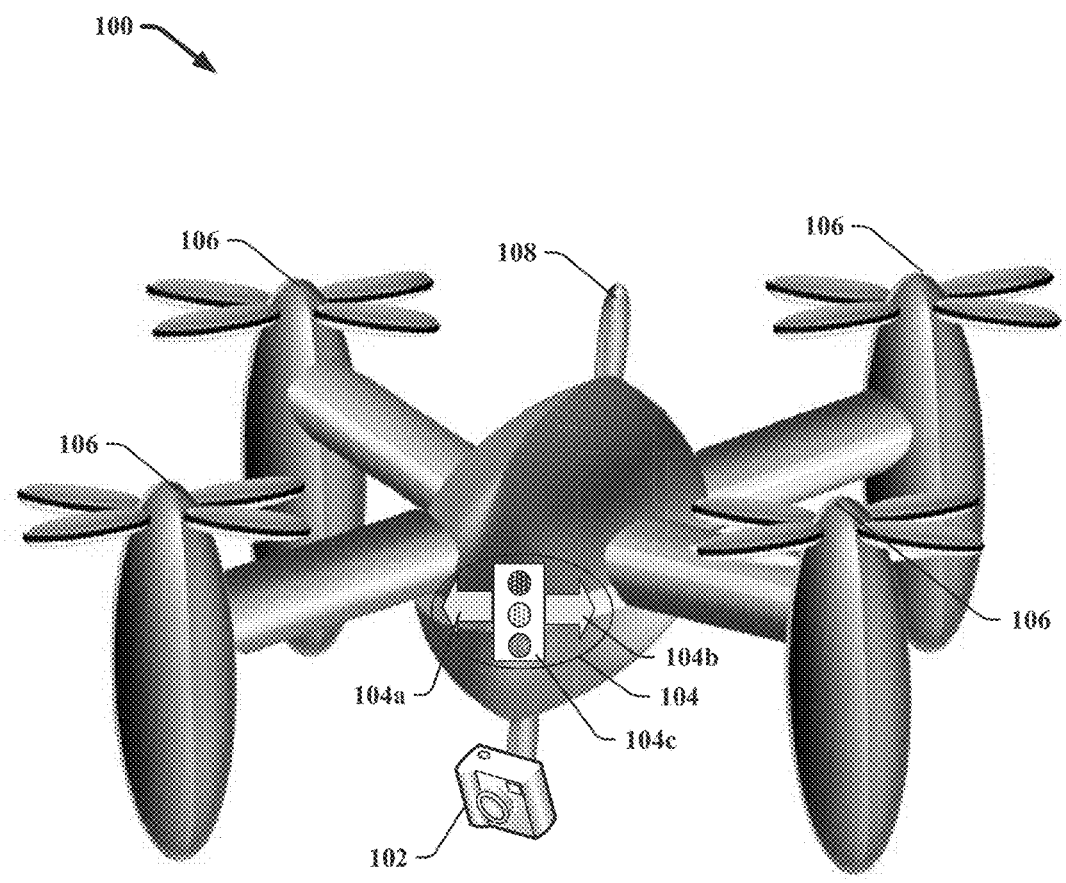
FIG. 1 illustrates a block diagram of an example, non-limiting aerial drone device in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Aircraft pilots frequently operate at airports at which they have rarely or never landed or taken off, and thus are oftentimes unfamiliar with the layout or operational procedures of the airport. Furthermore, there can be spoken or written language difficulties when communicating with aircraft arriving from another country. This can lead to the potential for pilots to make errors in navigating the aircraft ground movement paths of the airport, which can possibly result in an aircraft accident. For example, pilots have taken off from the wrong runway, have taken off without authorization, have crossed runways where another plane is landing or taking off, have moved along an incorrect ground movement path, have struck another object (e.g., aircraft, ground equipment, jetway, building, or other objects), and/or have misunderstood spoken instructions from the control tower. It has been estimated that approximately one third of aviation accidents occur on the ground.

FIGS. 1-4 illustrate block diagrams of example, non-limiting drone devices in accordance with one or more embodiments described herein. The subject disclosure is directed to computer processing systems, computer-implemented methods, apparatus and/or computer program products that facilitate efficiently, effectively, and automatically (e.g., with little or no direct human involvement) employing drone devices to guide aircraft along ground movement paths of an airport from a starting location to a destination location, and possibly including one or more intermediate locations. For example, in various embodiments, an aircraft that is attempting to land on a runway can be met by one or more drone devices that can lead the aircraft to a gate, a holding position, an unloading position, a repair facility, and/or any other suitable destination or position. Although the term "drone device" is used herein, in various embodiments, the examples provided can include one or more drone devices operating independently or in a distributed fashion, as applicable. All such embodiments are envisaged. The drone devices can monitor the aircraft, a selected ground movement path, and/or other airport conditions to detect or predict hazards (e.g., an object, a fire, a security attack, ice, fuel leak, aircraft speed, and/or any other hazard) and provide an indication to a pilot, pilot device, control tower device and/or control tower of a detected hazard, make alterations to the selected ground movement path or destination, and/or take any other suitable action in response to determination of the hazard.

In order to facilitate guiding aircraft along ground movement paths of an airport from a starting location to a destination location, one or more drone devices described herein can be employed that are communicating with each other, communicating with another device, communicating with a control tower, communicating with an aircraft, communicating with a pilot (or pilot device), communicating with ground equipment, communicating with ground personnel, communicating with emergency service personnel, and/or communicating with any other suitable equipment and/or personnel. The drone devices can coordinate amongst themselves to make decisions regarding actions to be taken by the drone devices. Drone devices can receive instructions from another device, such as a control system, regarding actions to be taken by the drone devices. Drone devices can receive instructions from equipment or an operator, such as control tower equipment or personnel, regarding actions to be taken by the drone devices. A drone device can autonomously make decisions regarding actions to be taken by the drone device. It is to be appreciated that drone devices can employ any of the aforementioned decision making methods, alone or in combination, regarding actions to be taken by the drone devices.

A drone device can be, in a non-limiting example, an aerial drone device, a submersible drone device, a terrestrial drone device, a mobile robotic device (e.g., humanoid shaped, animal shaped, and/or any other suitable shape), and/or any combination thereof. A drone device can include a propulsion system appropriate for the environments in which the drone device will operate, non-limiting examples of which include one or more propellers, one or more wings, one or more motors, one or more jet engines, one or more thrusters, one or more fins, one or more wheels, one or more continuous tracks, one or more buoyancy systems, one or more transmissions, one or more drivetrains, one or more rudders, one or more trims, one or more a tails, one or more arms, one or more legs, one or more springs, one or more steering assemblies, and/or any other suitable propulsion components or systems.

A drone device can include a power source, non-limiting examples of which include one or more batteries, one or more fuel cells, natural gas, compressed air, diesel fuel, gasoline, oil, propane, nuclear power system, solar power system, piezoelectric power system, and/or any other suitable power source. A drone device can include one or more computers, one or more processors, one or more memories, and one or more programs. A drone device can communicate via any suitable form of wireless or wired communication using a communication device. Non-limiting examples of wireless communication can include radio communication, optical communication, sonic communication, electromagnetic induction communication, and/or any other suitable wireless communication. A drone can include one or more instruments, non-limiting examples of which include a communication device, a radio frequency identification (RFID) reader, navigation device, a sensor, a camera, a video camera, a three-dimensional camera, a global positioning system (GPS) device, a motion sensor, a radar device, a temperature sensor, a light sensor, a thermal imaging device, an infrared camera, an audio sensor, an ultrasound imaging device, a light detection and ranging (LIDAR) sensor, sound navigation and ranging (SONAR) device, a microwave sensor, a chemical sensor, a radiation sensor, an electromagnetic field sensor, a pressure sensor, a spectrum analyzer, a scent sensor, a moisture sensor, a biohazard sensor, a gyroscope, an altimeter, a microscope, magnetometer, a device capable is seeing through or inside of objects, and/or any other suitable instruments. In addition, instruments can include tools, non-limiting examples of which include, a projectile launcher, a liquid sprayer, an air blower, a flame thrower, a heat projector, a cold projector, a scent projector, a chemical projector, an electric discharge device, a grasping device, a moveable and/or articulating arm, a hand, object manipulation devices, a fire extinguisher, a screwdriver, a hammer, a wrench, a welder, a saw, a knife, a pick, a prod, a vacuum device, a suction device, a sander, a laser, and/or any suitable tools to perform any task. Additionally, instruments can include one or more indicator devices, non-limiting examples of which can include, a light, a signal light, a light pattern, a display screen, an audio speaker, and/or any other suitable indicator device.

A drone device can be constructed out of any suitable material appropriate for environments in which the drone device will operate. A drone device can have suitable protection against an environment in which the drone device will operate, non-limiting examples of which include weather resistant, crush resistant, fire resistant, heat resistant, cold resistant, pressure resistant, impact resistant, liquid and/or solid material ingress protection, chemical resistant, corrosion resistant, shatter resistant, scratch resistant, biocontamination resistant, electromagnetic pulse resistant, electrical shock resistant, projectile resistant, explosion resistant, and/or any other suitable resistance for an environment in which the drone device will operate.

FIG. 1 illustrates a block diagram of an example, non-limiting aerial drone device 100 in accordance with one or more embodiments described herein. Drone device 100 can includes instrument 102, which in this example shows a camera; however any suitable instrument as disclosed herein can be included in drone device 100. Drone device 100 can also include instrument 104, which in this example shows a left indicator 104a, a right indicator 104b, and a stop/caution/go light indicator 104c; however any suitable indicator device as disclosed herein can be included in drone device 100.

Drone device 100 includes four propellers 106 in a quadcopter configuration, however, drone device 100 can include any suitable number of propellers 106 or any other suitable propulsion system. Drone device 100 can also include communication device 108. Drone device 100 can include other suitable components (not shown), such as those disclosed herein, and/or any other suitable components that can be implemented in a drone device.

Figure 2:
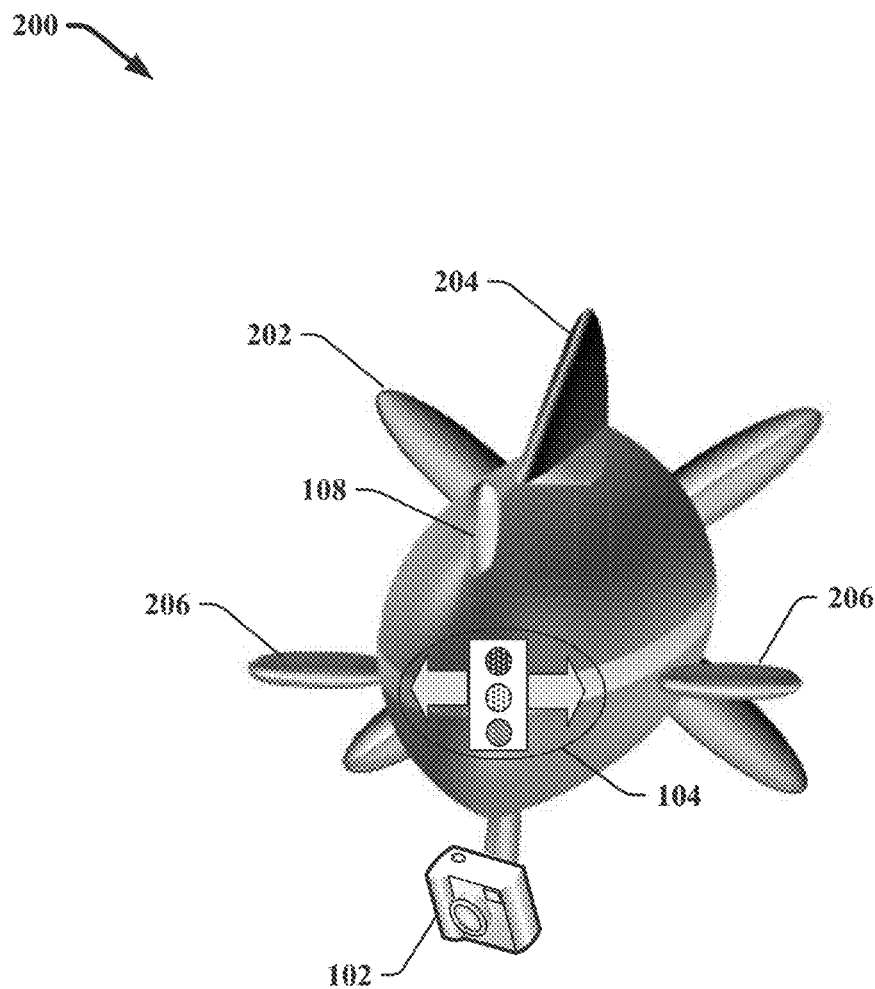
FIG. 2 illustrates a block diagram of an example, non-limiting submersible drone device in accordance with one or more embodiments described herein.

FIG. 2 illustrates a block diagram of an example, non-limiting submersible drone device 200 in accordance with one or more embodiments described herein. Drone device 200 can include instrument 102, which in this example shows a camera; however any suitable instrument as disclosed herein can be included in drone device 200. Drone device 200 can also include instrument 104; however any suitable indicator devices as disclosed herein can be included in drone device 200. Drone device 200 can include a propeller 202, rudder 204, and fins 206, however, drone device 200 can include any suitable number of propellers 202, rudders 204, fins 206, and/or any other suitable propulsion system. Drone device 200 can also include communication device 108. Drone device 200 can include other suitable components (not shown), such as those disclosed herein, and/or any other suitable components that can be implemented in a drone device.

Figure 3:
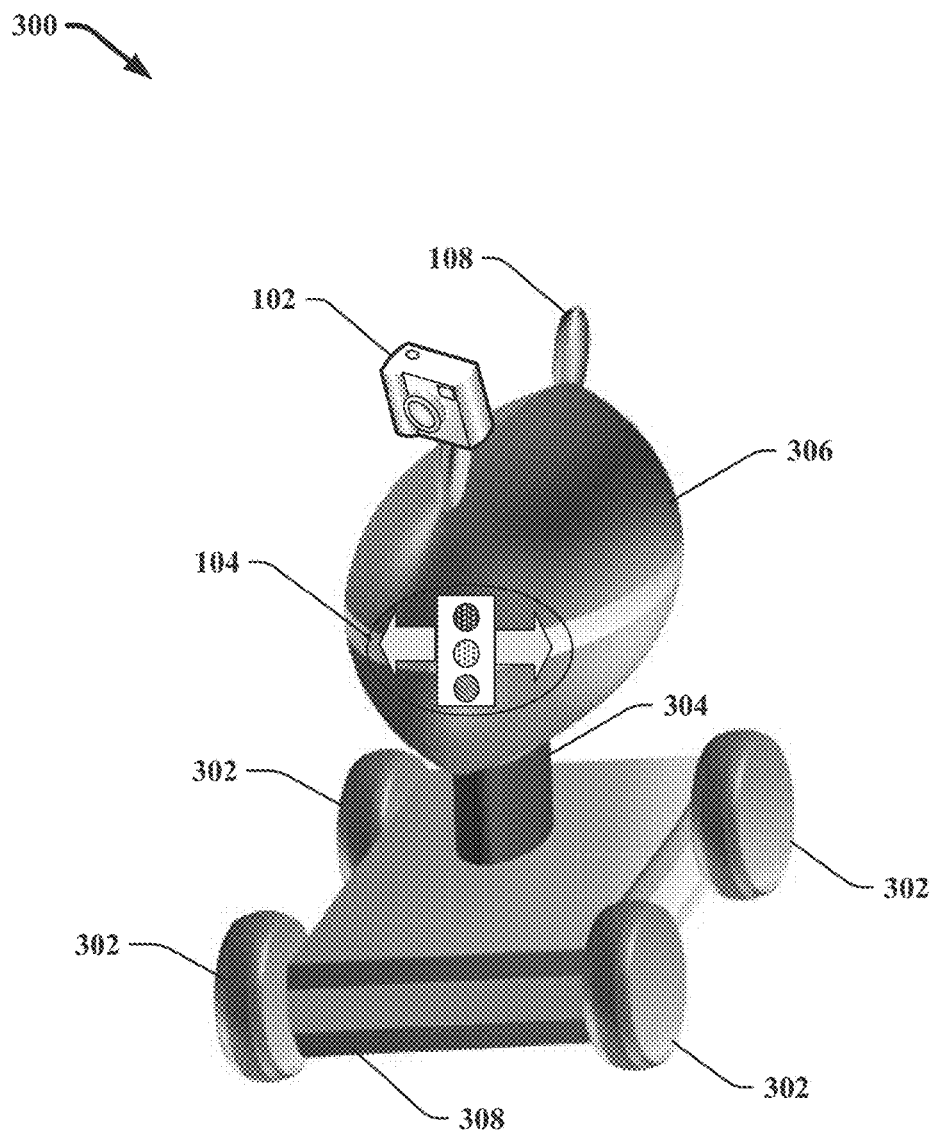
FIG. 3 illustrates a block diagram of an example, non-limiting terrestrial drone device in accordance with one or more embodiments described herein.

FIG. 3 illustrates a block diagram of an example, non-limiting terrestrial drone device 300 in accordance with one or more embodiments described herein. Drone device 300 can include instrument 102, which in this example shows a camera; however any suitable instrument as disclosed herein can be included in drone device 300. Drone device 300 can also include instrument 104; however any suitable indicator devices as disclosed herein can be included in drone device 300. While instrument 102 and instrument 104 are depicted as located on upper portion 306 of drone device 300, instrument 102 and instrument 104 can be located on lower portion 308 of drone device 300, and/or on both upper portion 306 and lower portion 308 of drone device 300. Drone device 300 can includes four wheels 302, however, drone device 300 can include any suitable number of wheels 302, and/or any other suitable propulsion system. Drone device 300 can also include communication device 108. Drone device 300 can also include a rotatable/extendable arm 304 that allows for instrument 102 and instrument 104 on upper portion 306 of drone device 300 to be positioned at any selected height and/or angle. Drone device 300 can include other suitable components (not shown), such as those disclosed herein, and/or any other suitable components that can be implemented in a drone device.

Figure 4:
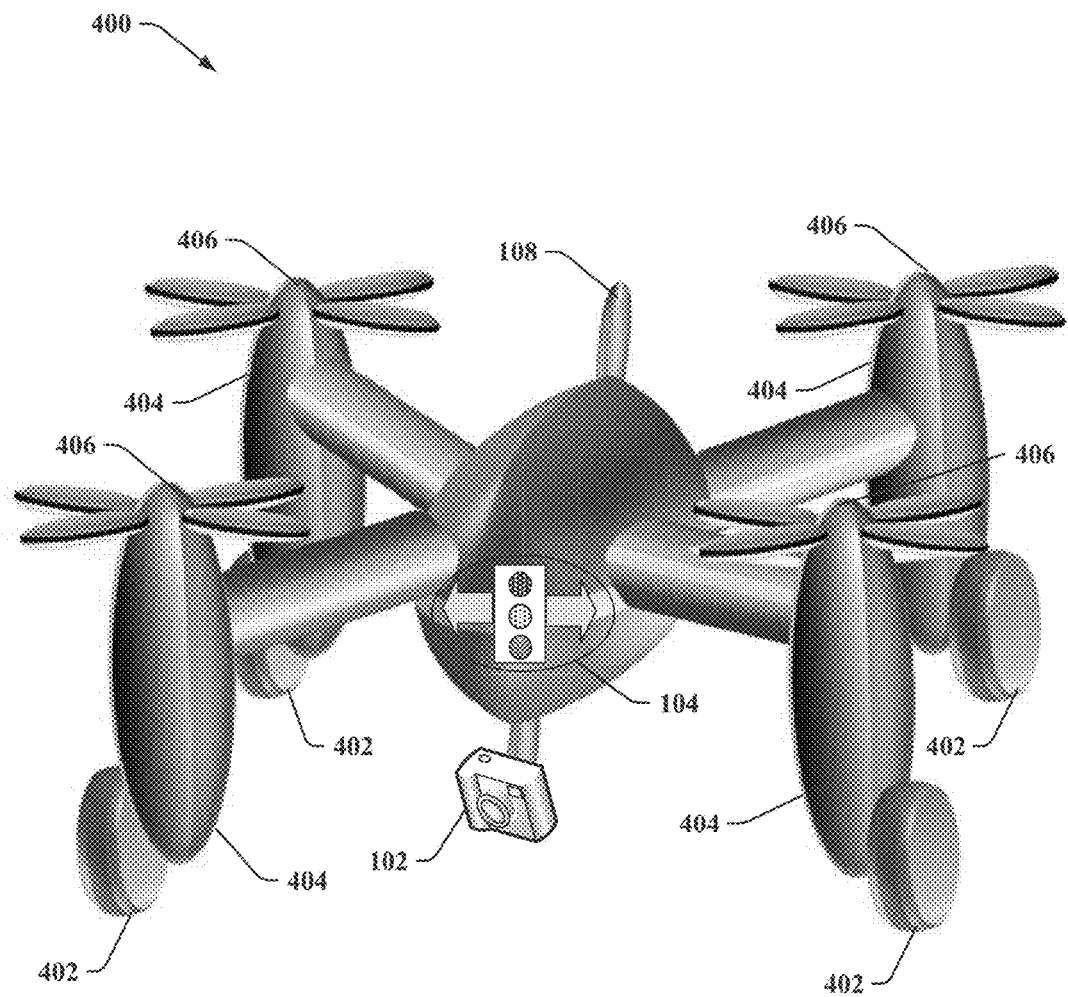
FIG. 4 illustrates a block diagram of an example, non-limiting combination aerial, submersible, and terrestrial drone device in accordance with one or more embodiments described herein.

FIG. 4 illustrates a block diagram of an example, non-limiting combination aerial, submersible, and terrestrial drone device 400 in accordance with one or more embodiments described herein. Drone device 400 can include instrument 102, which in this example shows a camera; however any suitable instrument as disclosed herein can be included in drone device 400. Drone device 400 can also include instrument(s) 104; however any suitable indicator devices as disclosed herein can be included in drone device 400. Drone device 400 can include four propellers 406 in a quadcopter configuration, however, drone device 400 can include any suitable number of propellers 106 or any other suitable propulsion system for aerial propulsion. Drone device 400 can include four wheels 402, however, drone device 400 can include any suitable number of wheels 402, and/or any other suitable propulsion system for terrestrial propulsion. Drone device 400 can also include rotatable/movable arms 404 that allow propellers 406 to be positioned for propulsion during submersion of drone device 400, however, drone device 400 can include any other suitable propulsion system for submersible propulsion. Drone device 400 can also include communication device 108. Drone device 400 can include other suitable components (not shown), such as those disclosed herein, and/or any other suitable components that can be implemented in a drone device.

The computer processing systems, computer-implemented methods, apparatus and/or computer program products employ hardware and/or software to solve problems that are highly technical in nature (e.g., related to automated drone devices performing processing to guide aircraft along ground movement paths of an airport, performing processing in a multi-dimensional area regarding potential hazards of different types, etc.), that are not abstract and that cannot be performed as a set of mental acts by a human. One or more embodiments of the subject computer processing systems, methods, apparatuses and/or computer program products enable drone devices to employ artificial intelligence to coordinate amongst themselves, and optionally with other devices, to perform actions to position one or more drone devices near an aircraft, guide the aircraft along a ground movement path of an airport, to monitor and/or predict hazards for the aircraft as the aircraft moves along the ground movement path, and perform hazard avoidance actions in response to a hazard.

While examples herein refer to aircraft at an airport for illustrative purposes, it is to be appreciated that the concepts disclosed herein can be employed for any type of vehicle that can be guided using one or more drone devices from a starting location to a destination location and avoiding or reducing the likelihood of occurrence of hazards. For example, a watercraft arriving/departing at a port, marina, and/or inland waterway can be guided by one or more aerial drone devices and/or one or more submersible drone devices between an entrance, docking slips, fueling stations, loading locations, unloading locations, an exit, and/or other areas associated with the port, marina, and/or inland waterway. In another example, a watercraft traversing a shipping channel can be guided by one or more aerial drone devices and/or one or more submersible drone devices from a starting location through the shipping channel to an ending location, such as to avoid other ships or changing features of the shipping channel, such as shifting sand bars, currents, tidal conditions, and/or other suitable changing features of the shipping channel. For example, a submersible drone device can determine real-time underwater shipping channel conditions and relay this information to an aerial drone device, while the aerial drone device determines real-time above water shipping channel conditions and provides indications to the captain/pilot of the watercraft relating to the underwater and above water shipping channel conditions. In a further example, a truck arriving/departing a delivery location, a pickup location, and/or a truck stop can be guided by one or more aerial drone devices and/or one or more terrestrial drone devices between a security entrance, a holding area, parking spots, buildings, loading/unloading docks, and/or other areas associated with the delivery location, pickup location, and/or truck stop. In an additional example, a bus arriving/departing at a bus station be guided by one or more aerial drone devices and/or one or more terrestrial drone devices between an entrance, bus gates, buildings, platforms, an exit, and/or other areas associated with a bus station. In another example, a train arriving/departing at a railyard can be guided by one or more aerial drone devices and/or one or more terrestrial drone devices between an entrance, track, buildings, platforms, an exit, and other areas associated with the railyard.

Figure 5:
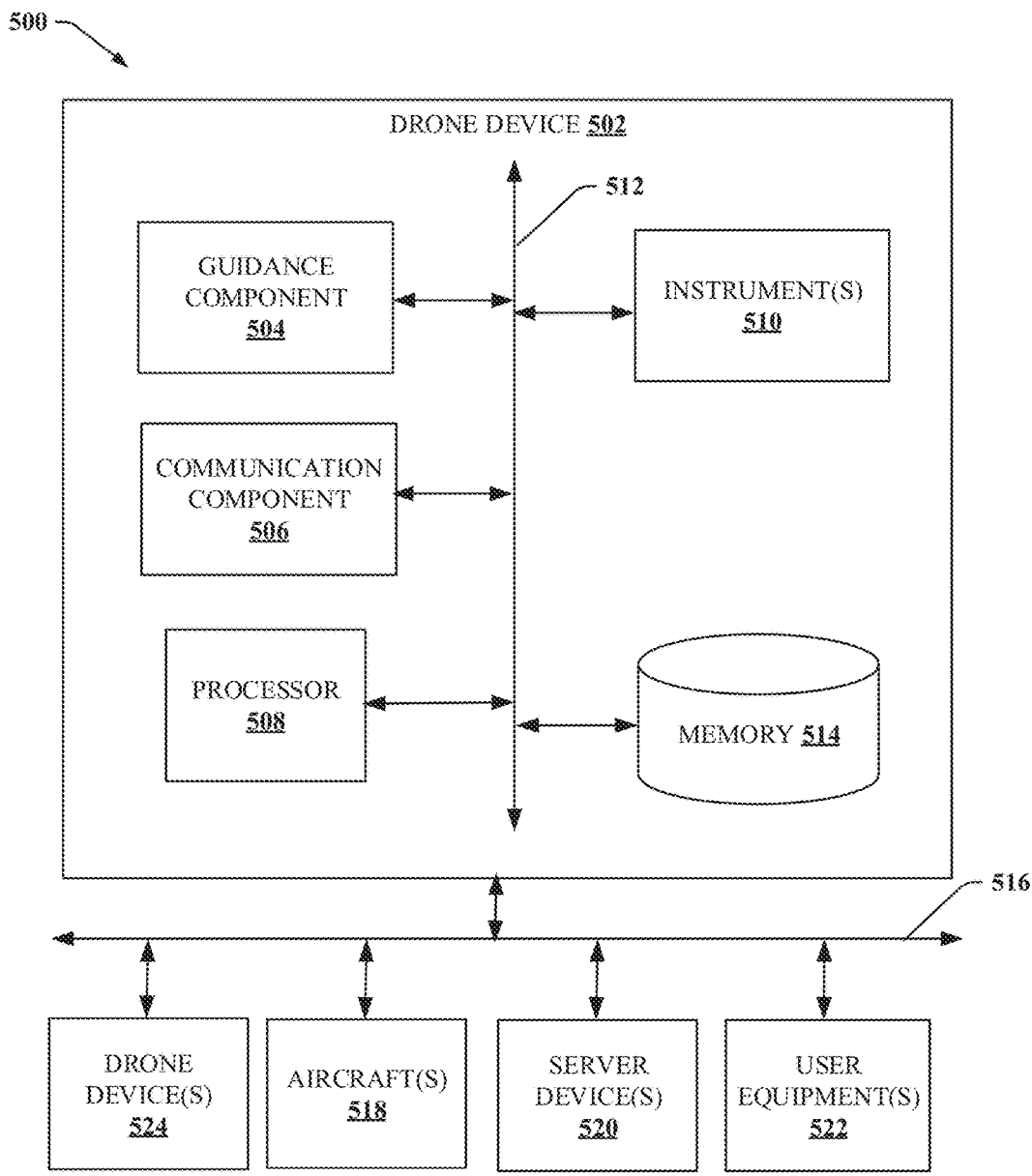
FIG. 5 illustrates a block diagram of an example, non-limiting system that facilitates automated drone devices guiding aircraft along ground movement paths of an airport in accordance with one or more embodiments described herein.

FIG. 5 illustrates a block diagram of an example, non-limiting system 500 that facilitates automated drone devices guiding aircraft along ground movement paths of an airport in accordance with one or more embodiments described herein. Repetitive description of like elements employed in other embodiments described herein is omitted for sake of brevity. Aspects of systems (e.g., system 500 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., one or more computers, one or more computing devices, one or more virtual machines, etc., can cause the one or more machines to perform the operations described.

As shown in FIG. 5, the system 500 can include one or more drone devices 502, 524, one or more networks 516, one or more aircraft 518, one or more server devices 520, and one or more user equipment 522. Drone devices 502, 524 can include the structure and/or functionality of one or more of drone device 100, 200, 300, 400 and/or any other structure and/or functionality described herein for drone devices. Drone device 524 can be a different type of drone device than drone device 502. Drone device 524 can also be a drone device 502 and/or include one or more components of drone device 502. It is to be appreciated that in discussions below where more than one drone device is employed, the drone devices can include drone device 502 and/or drone device 524.

Drone device 502 can include instruments 510 which can be instruments as discussed above. Drone device 502 can include communication component 506 that enables drone device 502 to communicate with other drone devices 524, aircraft 518, server devices 520, and user equipment 522 over one or more networks 516 via wireless and/or wired communications. Drone device 502 can include guidance component 504 that can enable drone device 502 to guide aircraft 518 along ground movement paths of an airport from a starting location to a destination location, and possibly including one or more intermediate locations, monitor aircraft 518, a selected ground movement path, and/or other airport conditions to determine (e.g., detect, infer, and/or predict) hazards, and provide an indication of a detected hazard, make alterations to the selected ground movement path or destination, and/or take any other suitable action in response to determination of the hazard.

Drone device 502 can include or otherwise be associated with at least one memory 514 that can store computer executable components (e.g., computer executable components can include, but are not limited to, the guidance component 504, communication component 506, and associated components). Drone device 502 can also include or otherwise be associated with at least one processor 508 that executes the computer executable components stored in the memory 514. Drone device 502 can further include a system bus 512 that can couple the various components including, but not limited to, guidance component 504, communication component 506, instruments 510, memory 514, processor 508, and/or other components. While a drone device 502 is shown in FIG. 5 to include guidance component 504, in other embodiments, any number of different types of devices can be associated with or include all or some of the components of guidance component 504. For example, server device 520 and/or user equipment 522 can include all or some of the components of guidance component 504. All such embodiments are envisaged. Aircraft 518 can include any aircraft 518 that employ an airport, non-limiting examples of which include commercial aircraft, non-commercial aircraft, military aircraft, government aircraft, and/or any other suitable aircraft that employ an airport. Server device 520 can be any computing device that can be communicatively coupled to drone device 502, non-limiting example of which can include a server computer, a computer, a mobile computer, a control system, an air traffic control system, a collision avoidance system, a ground control system, a weather computer, an emergency system, a communication system, a warning system, a radar system, a traffic system, and/or any other suitable computing device. User equipment 522 can be any device employed by a user, non-limiting examples of which include ground equipment, safety equipment, vehicles, a jetway control device, a communication device, a server device, and/or any other suitable device that can be employed by a user. It is to be appreciated that user equipment 522 can be equipped with a communication device that enable a user and/or the user equipment 522 to communicate with drone device 502 over network 516. Furthermore, drone device 502, 524, aircraft 518, server device 520, and user equipment 522 can be equipped with communication devices that enable communication between drone devices 502, aircraft 518, server devices 520, and user equipment 522 over one or more networks 516.

The various components (e.g., guidance component 504, communication component 506, instruments 510, memory 514, processor 508, drone devices 502, 524, aircraft 518, server devices 520, user equipment 522, and/or other components) of system 500 can be connected either directly or via one or more networks 124. Such networks 124 can include wired and wireless networks, including, but not limited to, a cellular network, a wide area network (WAN) (e.g., the Internet), and/or a local area network (LAN), non-limiting examples of which include cellular, WAN, wireless fidelity (Wi-Fi), Wi-Max, WLAN, radio communication, microwave communication, satellite communication, optical communication, sonic communication, electromagnetic induction communication, and/or any other suitable communication technology.

Figure 6:
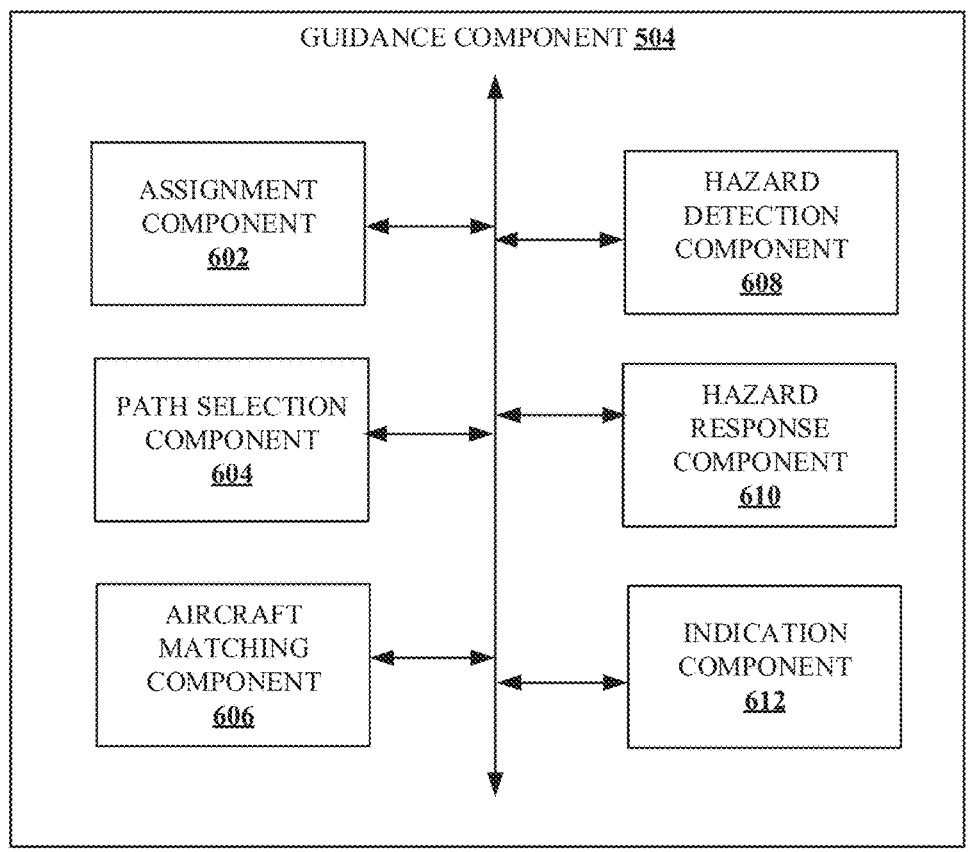
FIG. 6 illustrates a block diagram of an example, non-limiting guidance component for drone devices to guide aircraft in accordance with one or more embodiments described herein.

FIG. 6 illustrates a block diagram of an example, non-limiting guidance component 504 that can enable drone device 502 to guide aircraft 518 along ground movement paths. Repetitive description of like elements employed in other embodiments described herein is omitted for sake of brevity.

In some embodiments, the guidance component 504 can enable a drone device 502 to guide aircraft 518 from a starting location to a destination location (which can also include one or more intermediate locations). In some embodiments, guidance component 504 can include assignment component 602 that can determine an assignment of drone device 502 to an aircraft 518. Guidance component 504 can also include path selection component 604 that can determine a movement path for a drone device 502 and/or an aircraft 518. Guidance component 504 can include aircraft matching component 606 that can determine whether an aircraft 518 matches assignment information associated with an assignment of drone device 502 to an aircraft 518. Guidance component 504 can include hazard detection component 608 that can determine a hazard to aircraft 518. Guidance component 504 can also include hazard response component 610 that can determine an action to be taken by drone device 502 in response to determination of a hazard to aircraft 518. Guidance component 504 can also include indication component 612 that can operate an instrument 510 based upon a determined action to be taken by drone device 502.

Assignment component 602 can determine an assignment of drone device 502 to an aircraft 518 using self-determination (e.g., drone device 502 assigns an aircraft 518 to itself), by coordinating with one or more other drone devices 502 and/or one or more server devices 520, and/or based on instruction from one or more server devices 520 and/or one or more user equipment 522. Using self-determination, for example, assignment component 602 can monitor information regarding assignments of drone devices 502 to aircraft 518 and select an unassigned aircraft 518 for assignment to drone device 502 based upon assignment selection criteria. For example, assignment component 602 can determine that an arriving aircraft 518 does not have an assigned drone device 502, and can assign drone device 502 to arriving aircraft 518. In another example, assignment component 602 can determine that an aircraft 518 at a gate that is ready for departure does not have an assigned drone device 502, and can assign drone device 502 to arriving aircraft 518.

In another example, assignment component 602 can coordinate with one or more other drone devices 502 and/or one or more server devices 520 to exchange information such that a collective decision making process can be employed by assignment component 602, one or more drone devices 502, 524, and/or one or more server devices 520 to determine an assignment of an aircraft 518 to drone device 502. It is to be appreciated that server devices 520 can also include assignment component 602. In a non-limiting example, information exchanged can include current and/or previous assignments of drone devices 502 to aircraft 518, drone device 502 information (e.g., location of drone device 502, fuel level of drone device 502, operating status of drone device 502, fault status of drone device 502, maintenance state of drone device 502, capabilities (e.g., instruments and/or indicator devices) of drone device 502, drone device 502 dimensions, drone device 502 features, drone device 502 type, and/or any other suitable information relating to drone device 502), aircraft 518 information (e.g., aircraft type, aircraft features, aircraft dimensions, aircraft owner, aircraft operating state, aircraft fault state, aircraft maintenance state, aircraft crew information/state/location, aircraft passenger information/state/location, aircraft fuel state, aircraft location, aircraft speed, aircraft trajectory, and/or any other suitable information relating to aircraft 518), aircraft 518 arrival/departure timetables, airport information (e.g., current status, weather conditions, ground ice conditions, wind conditions, ground equipment information/state/location/trajectory, ground personnel information/state/location/trajectory, control tower information/state, communication system state, security state, gate information/state, jetway information/state, ground movement path information, and/or any other suitable information regarding an airport), and/or any other suitable information that can be employed by assignment component 602, drone devices 502, and/or server devices 520 to determine an assignment of an aircraft 518 to drone device 502.

In another example, one or more server devices 520 (e.g., an assignment component 602 on server device 520) can employ current and/or previous assignments of drone devices 502 to aircraft 518, drone device 502 information, aircraft 518 information, aircraft 518 arrival/departure timetables, airport information, and/or any other suitable information that can be employed by one or more server devices 520 to determine an assignment of an aircraft 518 to drone device 502 based on assignment selection criteria. A server device 520 can communicate an instruction to drone device 502 indicating the assignment of aircraft 518 to drone device 502.

It is to be appreciated that assignment component 602 can employ artificial intelligence to make determinations regarding assignment of aircraft 518 to drone devices 502 using information related to current and/or previous assignments of drone devices 502 to aircraft 518, drone device 502 information, aircraft 518 information, aircraft 518 arrival/departure timetables, airport information, and/or any other suitable information along with assignment selection criteria. In an example, assignment component 602 can select an unassigned aircraft 518 that is a shortest distance or shortest travel time from drone device 502. In another example, assignment component 602 can determine aircraft information of an unassigned aircraft 518 and drone device information of drone devices 502 and determine a drone device 502 that has sufficient capabilities (e.g., instruments, indicators, speed, altitude, communication, and/or any other suitable capability) to guide aircraft 518. For example, a terrestrial drone device 502 may not be able to provide indications at a height visible to a pilot of a large aircraft 518, but could provide indications to at a height visible to a pilot of a small non-commercial aircraft 518, and thus can be assigned to small non-commercial aircraft 518, but not large aircraft 518. In another example, a first aerial drone device 502 may not have sufficient instruments or speed to monitor an entire defined region (e.g., safety zone) around an aircraft 518, while a second aerial drone device 502 has sufficient instruments or speed to monitor the entire desired defined safety around aircraft 518 and can be assigned to aircraft 518. In another example, assignment component 602 can determine assignments of drone devices 502 to aircraft 518 based upon optimization of drone device 502 fuel consumption, drone device 502 travel distance, drone device 502 travel time, drone device 502 capabilities, safety, and/or any other suitable assignment selection criteria. Furthermore, assignment component 602 can employ a utility (e.g., cost/benefit) analysis in determining assignments of drone devices 502 to aircraft 518. In addition, assignment component 602 can employ learning algorithms using information relating to current and/or previous assignments of drone devices 502 to aircraft 518, drone device 502 information, aircraft 518 information, aircraft 518 arrival/departure timetables, airport information, and/or any other suitable information that can be employed by assignment component 602 to learn models for determining assignment of aircraft 518 to drone devices 502 that are optimized for assignment selection criteria. It is to be appreciated that assignment component 602 can employ any suitable information, any suitable assignment selection criteria, and any suitable function for assignment of aircraft 518 to drone devices 502.

Furthermore, assignment component 602 can assign a drone device 502 to an aircraft 518. For example, multiple drone devices 502 may be employed to guide a larger aircraft 518, each one performing different functions in relation to guiding aircraft 518, such as in a non-limiting example, one drone device 502 that is positioned in front of a cockpit of aircraft 518 to provide indications to the cockpit, one or more additional drone devices 502 that monitor a defined region around aircraft 518 for hazards, and/or one or more drone devices 502, 524 that provide indications to ground equipment or ground personnel regarding hazards associated with aircraft 518 along a ground movement path.

Path selection component 604 can determine a drone device movement path for drone device 502 from a starting location for drone device 502 to an ending location for drone device 502 selected from a plurality of possible drone device movement paths for drone device 502 from the starting location for drone device 502 to the ending location for drone device 502. Path selection component 604 can determine a drone device movement path for drone device 502 using self-determination (e.g., drone device 502 determines it owns drone device movement path), by coordinating with one or more other drone devices 502 and/or one or more server devices 520, and/or based on instruction from one or more server devices 520. It is to be appreciated that server devices 520 can include path selection component 604.

For example, once drone device 502 has been assigned to aircraft 518, path selection component 604 can determine a drone device movement path for drone device 502 from a starting location of drone device 502 to an ending location for drone device 502. For example, the starting location can be a current location of drone device 502 or a determined future location of drone device 502 at a time when drone device 502 can begin to traverse to an ending location to meet aircraft 518 that is assigned to drone device 502. Path selection component 604 can determine the drone device movement path based upon current and/or previous drone device movement paths of drone devices 502, drone device 502 information, aircraft 518 information, aircraft 518 arrival/departure timetables, airport information, and/or any other suitable information that can be employed by path selection component 604 to determine a drone device movement path for drone device 502 using any suitable drone path selection criteria. It is to be appreciated that path selection component 604 can also include an intermediate location for drone device (e.g., a holding area, a drone refueling area, and/or any other suitable intermediate location) between the starting location and ending location. For example, a drone device 502 that is low on fuel can be directed to a drone refueling area to refuel on its path from a starting location to an ending location. In another example, a drone device 502 that is assigned to meet an aircraft that is landing can be directed from a starting location to an intermediate holding area near an ending location at the landing strip until another aircraft 518 that has landed and/or another drone device 502 assigned to the other aircraft 518 has moved a defined distance away from the ending location.

Path selection component 604 can also determine a ground movement path for aircraft 518 from a starting location for aircraft 518 to an ending location for aircraft 518 selected from a plurality of possible ground movement paths for aircraft 518 from the starting location for aircraft 518 to the ending location for aircraft 518. For example, the starting location can be a current location of aircraft 518 or a determined future location of aircraft 518 at a time when aircraft 518 expected to meet drone device 502 that is assigned to aircraft 518. Path selection component 604 can determine the ground movement path based upon current and/or previous ground movement paths of aircraft 518, drone device 502 information, aircraft 518 information, aircraft 518 arrival/departure timetables, airport information, and/or any other suitable information that can be employed by path selection component 604 to determine a ground movement path for aircraft 518 using any suitable ground path selection criteria. It is to be appreciated that path selection component 604 can also include an intermediate location for aircraft 518 (e.g., a holding area, a drone refueling area, a de-icing area, and/or any other suitable intermediate location) between the starting location and ending location. For example, path selection component 604 can determine that current weather conditions are likely to produce ice on aircraft 518, and direct aircraft 518 from starting location near a gate to an intermediate de-icing location to de-ice aircraft 518 prior to proceeding to an ending location at a takeoff runway. In another example, path selection component 604 can determine that a gate assigned to landing aircraft 518 is currently occupied and direct aircraft 518 from starting location near a landing runway to an intermediate holding location to wait for a gate assigned to aircraft 518 to become unoccupied by another aircraft 518 prior to proceeding to an ending location near the gate assigned to aircraft 518.

It is to be appreciated that path selection component 604 can employ artificial intelligence to make determinations regarding selection drone device movement paths for one or more drone devices 502, 524 using information related to current and/or previous drone device movement paths of one or more drone devices 502, 524, drone devices 502, 524 information, aircraft 518 information, aircraft 518 arrival/departure timetables, airport information, and/or any other suitable information along with drone path selection criteria. In an example, path selection component 604 can select drone device movement path that is a shortest distance or shortest travel time from starting location to ending location, including any intermediate locations. In another example, path selection component 604 can determine a safest drone device movement path for drone device 502 to travel from starting location to ending location, including any intermediate locations. For example, path selection component 604 can determine a drone device movement path that maintains a defined distance (e.g., a safe distance) between drone device 502 and hazards that are determined to be near a drone device movement path for drone device 502. In another example, path selection component 604 can determine a drone device movement path for drone device 502 based upon optimization of drone device 502 fuel consumption, drone device 502 travel distance, drone device 502 travel time, drone device 502 capabilities, safety, and/or any other suitable drone path selection criteria. Furthermore, path selection component 604 can employ a utility (e.g., cost/benefit) analysis in determining a drone device movement path for drone device 502 between a starting location and an ending location, including any intermediate locations. In addition, path selection component 604 can employ learning algorithms using information relating to current and/or previous drone device movement paths of one or more drone devices 502, 524, drone device 502 information, aircraft 518 information, aircraft 518 arrival/departure timetables, airport information, and/or any other suitable information that can be employed by path selection component 604 to learn models for determining drone device movement path for drone device 502 that are optimized for drone path selection criteria. It is to be appreciated that path selection component 604 can employ any suitable information, any suitable drone path selection criteria, and any suitable function for determining drone device movement paths for one or more drone devices 502, 524.

Aircraft matching component 606 can match an aircraft 518 to assignment information associated with an assignment of aircraft 518 to drone device 502. For example, assignment component 602 can make available assignment information to aircraft matching component 606 regarding assignment of aircraft 518 to drone device 502. In a non-limiting example, assignment information can include identification information for aircraft 518, such as an aircraft radio beacon identifier, an aircraft tail number, a registration number, an airline identifier, an aircraft type, an airplane marking, a logo, a crew member information, and/or any other suitable information that can be employed for identifying aircraft 518. Upon arrival of drone device 502 at an ending location to meet aircraft 518, aircraft matching component 606 can employ instruments 510 to match information sensed from aircraft 518 to identification information for aircraft 518 to ensure that drone device 502 has met and is going to guide the correct aircraft 518. In a non-limiting example, information sensed can include a signal transmission (e.g., including a coded aircraft beacon identifier, spoken identification information, and/or any other suitable information that can be transmitted) that can be employed by aircraft matching component 606 using a decoding algorithm or voice recognition, an image captured that can be employed by aircraft matching component using image recognition processes (e.g., optical character recognition, object recognition, shape recognition, facial recognition, and/or any other suitable information that can be sensed by an instrument an employed by aircraft matching component 606 to matched against identification information for aircraft 518. If aircraft matching component 606 determines that aircraft 518 does not match identification information for aircraft 518 in assignment information, then drone device 502 can take action, non-limiting examples of which include moving away from the ending location to a holding location, communicating with one or more other drone devices) 502 and/or one or more other server devices 520 to determine where assigned aircraft 518 is currently located, get reassigned to aircraft 518 at the ending location, and/or any other suitable action to remedy the situation.

If aircraft matching component 606 determines that aircraft 518 matches identification information for aircraft 518 in assignment information, then guidance component 504 of drone device 502 assigned to aircraft 518 can take action suitable for guiding aircraft 518 along a selected ground movement path, non-limiting examples of which include moving drone device 502 to a position relative to aircraft 518 suitable for guiding aircraft 518 along the selected ground movement path, communicating with a recipient (e.g., crew member (e.g., pilot, co-pilot, first officer, radio operator, flight attendant, and/or other crew member) on aircraft 518, ground personnel, control tower personnel, safety personnel, a drone device 502, a server device 520, a user equipment 522, any other personnel associated with an airport, and/or any other suitable recipient) using one or more other instruments 510 (e.g., synthesized voice over radio or speaker, transmitting an electronic message (e.g., textual, graphical, encoded, encrypted, and/or any other suitable electronic message), display screen (e.g., textual or graphical message), one or more other signal lights, audio message projected via a speaker, and/or any other suitable instruments 510) to provide an indication regarding one or more other actions to be taken in relation to guiding aircraft 518 along the selected ground movement path, moving drone device 502 to a position relative to aircraft 518 suitable for monitoring a defined region associated with aircraft 518 for hazards, and/or any other suitable action for guiding aircraft 518 along the selected ground movement path.

Guidance component 504 can define a region around aircraft 518 or receive information from another drone device 502 or server device 520 defining a region around aircraft 518 for monitoring of hazards. It is to be appreciated that server devices 520 can include a guidance component 504 and can provide information generated by guidance component 504 to one or more drone devices 502, 524. The defined region can be a two dimensional or three dimensional zone around all or one or more other portions of aircraft 518. The defined region can be determined using information based upon current and/or previous defined regions of aircraft 518, known hazards associated with aircraft 518, drone device 502 information, aircraft 518 information, aircraft 518 arrival/departure timetables, airport information, and/or any other suitable information that can be employed by guidance component 504 to determine a defined region for aircraft 518 based upon any suitable safety criteria. Furthermore, guidance component 504 can adjust a defined region around aircraft 518 while aircraft 518 is stationary or in motion based upon real-time information associated with aircraft 518, drone device 502 information, aircraft 518 information, aircraft 518 arrival/departure timetables, airport information, and/or any other suitable information that can be employed by guidance component 504 to determine a defined region for aircraft 518. In a non-limiting example, guidance component 504 can employ a utility analysis based on determined respective risks associated with hazards along a selected ground movement path to make adjustments to a defined region around aircraft 518 as aircraft 518 moves along the selected ground movement path and nears each hazard. In another non-limiting example, guidance component can adjustment a defined region around aircraft 518 when stationary based upon changing weather conditions.

In an example, guidance component 504 can move one or more drone devices 502, 524 to one or more other positions relative to aircraft 518 to inspect aircraft 518, the defined region around aircraft 518, an area outside of the defined region, and/or a selected ground movement path for aircraft 518 for hazards. Indication component 612 can provide an indication to a recipient indicating that drone device 502 is conducting an inspection of aircraft 518, the defined region around aircraft 518, the area outside of the defined region, and/or the selected ground movement path for aircraft 518 for hazards.

In another example. guidance component 504 can move one or more other drone devices 502 to one or more other positions relative to aircraft 518 to guide aircraft 518 along the selected ground movement path for aircraft 518. Indication component 612 can provide an indication to a recipient indicating that aircraft 518 should take a specific action with respect to moving along the selected ground movement path. For example, indication component 612 can provide an indication to a recipient associated with aircraft 518 to move aircraft 518 in a specific direction associated with the selected ground movement path for aircraft 518, non-limiting example of which include move straight forward, move forward to the left, turn left, move forward to the right, turn right, move straight backward, move backward to the left, move backward to the right, slow down, speed up, stop, and/or any other suitable movement action indication.

It is to be appreciated that guidance component 504 can employ artificial intelligence to make determinations regarding actions for drone devices to perform related to guiding aircraft 518 using information related to current and/or previous actions performed related to guiding aircraft 518, drone device 502 information, aircraft 518 information, aircraft 518 arrival/departure timetables, airport information, object information, and/or any other suitable information along with any suitable decision criteria. In addition, guidance component 504 can employ learning algorithms using information relating to actions performed related to guiding aircraft 518, drone device 502 information, aircraft 518 information, aircraft 518 arrival/departure timetables, airport information, object information, and/or any other suitable information that can be employed by guidance component 504 to learn models for determining actions for drone devices to perform related to guiding aircraft 518 optimized for any suitable decision criteria. Guidance component 504 can learn behaviors of aircraft 518, drone devices, and/or objects for determining actions to perform related to guiding aircraft 518. It is to be appreciated that guidance component 504 can employ any suitable information, any suitable decision criteria, and any suitable function for determining actions for drone devices to perform related to guiding aircraft 518.

During inspection or movement of aircraft 518, hazard detection component 608 can employ instruments 510 to monitor aircraft 518, the defined region around aircraft 518, the area outside of the defined region for aircraft 518, and/or the selected ground movement path for aircraft 518 for hazards. In a non-limiting example, hazards can include a set of known hazards that can occur associated with objects (e.g., aircraft 518, one or more drone devices 502, 524, ground equipment, ground personnel, vehicles, jetways, buildings, grounds, roads, animals, debris, and/or any other suitable object that may be at an airport), weather, security, and/or any items associated with an airport, and interaction therebetween. In another non-limiting example, hazards can include learned hazards, inferred hazards, predicted hazards, received information regarding hazards that can occur associated with aircraft 518, one or more drone devices 502, 524, objects, weather, security, and/or any items associated with an airport, and interaction therebetween.

In an example, hazard detection component 608 can inspect an exterior and/or interior of aircraft 518 for hazards, non-limiting examples of which can include a fuel leak, a fire, smoke, a displaced aircraft part, a damaged aircraft part, a hijacking, an open door or hatch, a flat tire, ice buildup, and/or any other suitable hazard associated with the aircraft 518. In another example, hazard detection component 608 can determine an object that is stationary or in motion that is predicted to collide or be within an unsafe distance from aircraft 518 while aircraft 518 is stationary or in motion. In another example, hazard detection component 608 can monitor a defined region around aircraft 518 to identify an object that has entered the defined region and poses a hazard to aircraft 518 while aircraft 518 is stationary or in motion. For example, a fuel truck has parked near a wing of aircraft 518 ready to depart from a gate and is predicted to result in a collision with aircraft 518 if aircraft 518 moves in a particular direction.

In a further example, hazard detection component 608 can monitor an area outside of the defined region around aircraft 518 to identify an object with determined dimensions that is moving in a determined trajectory (e.g., direction, path, velocity, and/or any other suitable information related to trajectory) that is predicted to intersect with the defined region of aircraft 518 and is determined to pose a hazard to aircraft 518 while aircraft 518 is stationary or based on a determined trajectory of aircraft 518 while in motion. For example, an airplane is moving on a path that is predicted intersect with the defined region of aircraft 518 while aircraft 518 is moving on a selected ground movement path which is predicted to result in a wing of the airplane colliding with a portion of aircraft 518. In another example, a bird is flying on a path this is predicted to bring the bird within an unsafe distance from an operating jet engine of aircraft 518.

In a further example, hazard detection component 608 can monitor an area outside of the defined region around aircraft 518 to identify a stationary object with determined dimensions that is predicted to intersect with the defined region of aircraft 518 based on a determined trajectory of aircraft 518 while in motion and is determined to pose a hazard to aircraft 518. For example, food truck has stopped on a tarmac in a position that is predicted to intersect with the defined region of aircraft 518 while aircraft 518 is moving on a selected ground movement path which is predicted to result in a portion of the food truck being within an unsafe distance from a portion of aircraft 518.

In another example, hazard detection component 608 can monitor an environment of an airport for one or more conditions that are determined to pose a hazard to aircraft 518 and/or objects that are predicted to intersect with a defined region of aircraft 518, non-limiting examples of which include weather conditions, icy grounds, high winds, sand storm, dust storm, lightning, rain storm, snow storm, poor visibility, a security threat, an object on fire, a ground fire, a plurality of animals, a backup of aircraft waiting to take off, an earthquake, a flood, snow buildup on grounds, and/or any other suitable condition associated with an environment of an airport.

In a further example, hazard detection component 608 assign respective risk levels to hazards. Furthermore, hazard detection component 608 can employ a utility analysis based on determined respective risks associated with hazards along with hazard selection criteria to determine which hazards pose a risk to an aircraft 518 or object. In a non-limiting example, hazard selection criteria can be a function based on one or more thresholds associated with risk levels of hazards.

In a further example, hazard detection component 608 can capture data associated with a potential problem using one or more instruments 510 and communicating the captured data to a recipient.

It is to be appreciated that hazard detection component 608 can employ artificial intelligence to make determinations regarding hazards using information related to current and/or previous hazards, drone device 502 information, aircraft 518 information, aircraft 518 arrival/departure timetables, airport information, object information, and/or any other suitable information along with hazard identification criteria. In addition, hazard detection component 608 can employ learning algorithms using information relating to current and/or hazards, drone device 502 information, aircraft 518 information, aircraft 518 arrival/departure timetables, airport information, object information, and/or any other suitable information that can be employed by hazard detection component 608 to learn models for determining hazards associated with aircraft 518 and/or objects optimized for hazard identification criteria. Hazard detection component 608 can learn behaviors of aircraft 518, drone devices, and/or objects for determining hazards associated with aircraft 518 and/or objects. Hazard detection component 608 can employ intelligent recognition techniques (e.g., audio recognition, image recognition, motion recognition, spatial relationship recognition, pattern recognition, object recognition, facial recognition, pose recognition, shape recognition, scene recognition, hue recognition, feature recognition, edge recognition, timing recognition, and/or any other suitable recognition technique) associated data captured by instruments 510 for determining hazards associated with aircraft 518 and/or objects. It is to be appreciated that hazard detection component 608 can employ any suitable information, any suitable hazard identification criteria, and any suitable function for determining hazards associated with aircraft 518 and/or objects. It is to be appreciated that server devices 520 can include hazard detection component 608 and can provide information to one or more drone devices 502, 524 regarding hazards.

Hazard response component 610 can determine one or more actions for one or more drone devices 502, 524 to perform in response to determination of a hazard by hazard detection component 608. In a non-limiting example, hazard response component 610 can determine an action for drone device 502 to perform to mitigate occurrence of a determined hazard. For example, hazard response component 610 can determine an action for drone device 502 to perform that prevents or reduces a probability that the determined hazard will actually occur. In another non-limiting example, hazard response component 610 can determine an action for drone device 502 to perform to mitigate an effects of a determined hazard that has or will occur. For example, hazard response component 610 can determine an action for drone device 502 to perform that reduces or prevents an effect if the determined hazard actually occurs, non-limiting example of which can include reduced aircraft and/or object damage, reducing cost, reducing human life loss, reducing human injury, reducing animal life loss, reducing animal injury, reducing security risk, reducing impact to flight schedule, reducing aircraft downtime, and/or any other effect that can result from the determined hazard occurring.

In an example, hazard response component 610 can determine one or more action for one or more drone devices 502, 524 to perform in response to determination of a hazard, wherein the action includes providing an indication to one or more recipients, wherein the indication can include in a non-limiting example, an indication informing the one or more recipients of the hazard or information related to the hazard, an indication of an action the one or more recipients should perform related to mitigating the hazard or an effects of the hazard, an indication informing the one or more recipients of actions being performed by others related to mitigating the hazard or an effects of the hazard, and/or any other suitable indication related to the hazard that can be provided to a recipient. Hazard response component 610 can instruct guidance component 504 to move drone device 502 to a location suitable for providing the indication to the one or more recipients. Hazard response component 610 can instruct indication component 612 to provide an indication relating to the hazard to the one or more recipients using one or more instruments 510. For example, guidance component 504 can move drone device 502 in a position visible to a crew member in a cockpit of aircraft 518 and indication component 612 can provide a visual indication relating to the hazard using a visual indicator device (e.g., a light, a signal light, a light pattern, a display screen) to the crew member. In another example, guidance component 504 can move drone device 502 in a position audible to a ground personnel and indication component 612 can provide an audible indication relating to the hazard using an audio indicator device (e.g., an audio speaker) to the ground personnel. In another example, indication component 612 can provide an electronic message transmission including an indication relating to the hazard using a communication device to the recipient. In another example, indication component 612 can use a projectile launcher to launch a projectile, such as a flare to provide an indication relating to the hazard to the recipient(s). In another example, indication component 612 can provide an electronic message transmission to the recipient including an indication relating to the hazard using a communication device. In another example, guidance component 504 can cause drone device 502 to move in a pattern that provides an indication relating to the hazard to the recipient.

In an example, hazard response component 610 can determine one or more action for one or more drone devices 502, 524 to perform in response to determination of a hazard, wherein the action includes performing a prevention action to mitigate occurrence of the hazard. For example, if the hazard is a fire on or near aircraft 518, the prevention action can be an action using one or more instruments 510 to suppress the fire, non-limiting examples of which include using a fire extinguisher on the fire, spraying the fire with a fire suppression chemical using a chemical sprayer, spraying the fire with water using a water sprayer, communicating with a fire department, and/or any other suitable action to suppress the fire on or near aircraft 518.

In another example, if the hazard is an animal within or near a defined region of aircraft 518, the prevention action can be an action using one or more instruments 510 to drive the animal a safe distance away from the aircraft 518, non-limiting examples of which include making a sound with a speaker, spraying a scent at or near the animal, providing a safe electric shock to the animal with an electric discharge device, blowing air with an air blower device at the animal, directing light to the animal using a light projection device, directing heat to the animal with a heat projection device, directing cold with a cold projection device, spraying a chemical at or near the animal, using an arm to prod the animal, communicating with an animal control department, move one or more drone devices 502, 524, in a pattern that cause the animal to move in a desired direction, and/or any other suitable an action using instruments 510 to drive the animal a safe distance away from the aircraft 518.

In a further example, if the hazard is ice on aircraft 518, the prevention action can be an action using one or more instruments 510 to remove the ice, non-limiting examples of which include spraying the ice with a de-icing chemical using a chemical sprayer, directing heat on the ice with a heat projection device, communicating with airport personnel, and/or any other suitable action to remove the ice on aircraft 518. In another example, if the hazard is an object that is or will be on a selected ground movement path of aircraft 518, the prevention action can be an action using one or more instruments 510 to prevent the object from colliding with aircraft 518 on the selected ground movement path of aircraft 518, non-limiting examples of which include picking up the object with a vacuum tool, moving the object with a grasping tool or one or more arms, communicating with ground personnel to move the object, and/or any other suitable action to prevent the object from colliding with aircraft 518 on the selected ground movement path of aircraft 518.

In another example, if the hazard is another aircraft 518 that is or will be on a selected ground movement path of aircraft 518, the prevention action can be an action using one or more instruments 510 to prevent the other aircraft 518 from colliding with aircraft 518 on the selected ground movement path of aircraft 518, non-limiting examples of which include communicating with a crew member of the other aircraft 518 avoid a collision with aircraft 518, communicating with control tower or ground personnel avoid a collision between the other aircraft 518 and aircraft 518, communicating with a crew members of aircraft 518 avoid a collision with the other aircraft 518, instructing path selection component 604 to select a new ground movement path for aircraft 518 that avoids collision with the other aircraft 518 and instructing guidance component 504 to guide aircraft 518 to the new ground movement path, and/or any other suitable action to prevent the other aircraft 518 from colliding with aircraft 518 on the selected ground movement path of aircraft 518.

In another example, if the hazard is another aircraft 518 that is a gate assigned to aircraft 518, the prevention action can be an action instructing path selection component 604 to select an intermediate holding location for aircraft 518 to wait until the assigned gate is clear of the other aircraft 518 an determined a new ground movement path for aircraft 518 that includes the intermediate holding location prior to the assigned gate for aircraft 518, and instructing guidance component 504 to guide aircraft 518 to the new ground movement path to the intermediate holding location. Using the same example, the prevention action can be an action instructing path selection component 604 to assign another gate to aircraft 518 and determined a new ground movement path for aircraft 518 that the assigned other gate for aircraft 518, and instructing guidance component 504 to guide aircraft 518 to the new ground movement path to the assigned other gate for aircraft 518.

In an additional example, if the hazard is an observed problem (e.g., mechanical, structural, operational, etc.) with aircraft 518, the prevention action can include capturing data associated with the observed problem using one or more instruments 510 (e.g., a camera, a thermal imaging device, a temperature sensor, a light sensor, an infrared camera, an audio sensor, an ultrasound imaging device, a chemical sensor, a radiation sensor, a pressure sensor, a spectrum analyzer, a scent sensor, a moisture sensor, a biohazard sensor, and/or any other suitable instruments 510 for capturing data associated with an observed problem with aircraft 518) and communicating the data to one or more recipients, guiding aircraft 518 to a maintenance or repair facility, and/or any other suitable action to mitigate an observed problem with aircraft 518.

It is to be appreciated that hazard response component 610 can employ artificial intelligence to make determinations regarding actions to perform related to mitigating a hazard or effects of a hazard using information related to current and/or previous actions performed related to mitigating a hazard or effects of a hazard, drone device 502 information, aircraft 518 information, aircraft 518 arrival/departure timetables, airport information, object information, and/or any other suitable information along with any suitable hazard mitigation criteria. In addition, hazard response component 610 can employ learning algorithms using information relating to actions performed related to mitigating a hazard or effects of a hazard, drone device 502 information, aircraft 518 information, aircraft 518 arrival/departure timetables, airport information, object information, and/or any other suitable information that can be employed by hazard response component 610 to learn models for determining actions to perform related to mitigating a hazard or effects of a hazard optimized for any suitable hazard mitigation criteria. Hazard response component 610 can learn behaviors of aircraft 518, drone devices, and/or objects for determining actions to perform related to mitigating a hazard or effects of a hazard. It is to be appreciated that hazard response component 610 can employ any suitable information, any suitable hazard mitigation criteria, and any suitable function for determining actions to perform related to mitigating a hazard or effects of a hazard. It is to be appreciated that server devices 520 can include hazard response component 610 and can provide information to drone devices 502 regarding actions to perform related to mitigating a hazard or effects of a hazard.

FIG. 7 illustrates a block diagram of a non-limiting example airport 700 with drone devices 502 guiding aircraft 518 in accordance with one or more embodiments described herein. Repetitive description of like elements employed in other embodiments described herein is omitted for sake of brevity.

In FIG. 7, aircraft 518a has landed and is being met by drone device 502a at starting location A, and is being guided along ground movement path for aircraft 518a to ending location B near an assigned gate for aircraft 518a. Aircraft 518a has defined region 702a that will be monitored by drone device 502 for hazards. Also in FIG. 7, aircraft 518c which recently landed is being guided by drone device 502f from starting location A along ground movement path for aircraft 518a to intermediate location G to wait until aircraft 518f has cleared a gate assigned to aircraft 518c so drone device 502f can guide aircraft 518c along ground movement path for aircraft 518a to ending location H. Aircraft 518c has defined region 702c that will be monitored by drone device 502f for hazards. In FIG. 7, aircraft 518b is very large has been assigned multiple drone devices 502b, 502c, and 502d to guide aircraft 518b from starting location I along ground movement path for aircraft 518a to ending location F near a takeoff runway. Aircraft 518c has defined region 702b that will be monitored by drone devices 502b, 502c, and 502d for hazards. In FIG. 7, aircraft 518d has been assigned drone device 502e to guide aircraft 518d from starting location E along ground movement path for aircraft 518d to ending location F near the takeoff runway. Aircraft 518d has defined region 702d that will be monitored by drone device 502e for hazards. In FIG. 7, drone device 502 has completed guiding aircraft 518e to ending location F near the takeoff runway, and has been reassigned to aircraft 518f. Drone device 502g determines a drone device movement path for drone device 502g from its current starting location C to ending location D to meet aircraft 518f. Aircraft 518f has defined region 702e that will be monitored by drone device 502g for hazards. It is to be appreciated that drone devices 502a-g in FIG. 7 will monitor drone device movement paths, ground movement paths, and defined regions 702a-e for hazards during movement of drone device 502a-g and aircraft 518a-f.

FIGS. 8A-8H illustrate block diagrams of non-limiting example drone devices 502 providing visual indications to crew members in a cockpit of aircraft 518 from the viewpoint of the crew members in the cockpit of aircraft 518 in accordance with one or more embodiments described herein. Repetitive description of like elements employed in other embodiments described herein is omitted for sake of brevity.

Figure 8A:
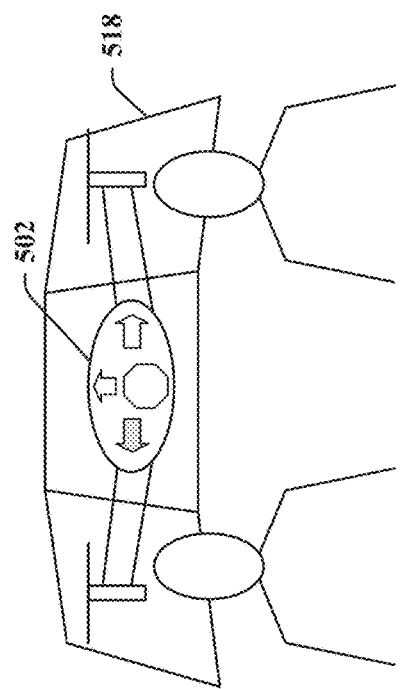
FIGS. 8A-8H illustrate block diagrams of non-limiting example drone devices providing visual indications in accordance with one or more embodiments described herein.
Figure 8B:
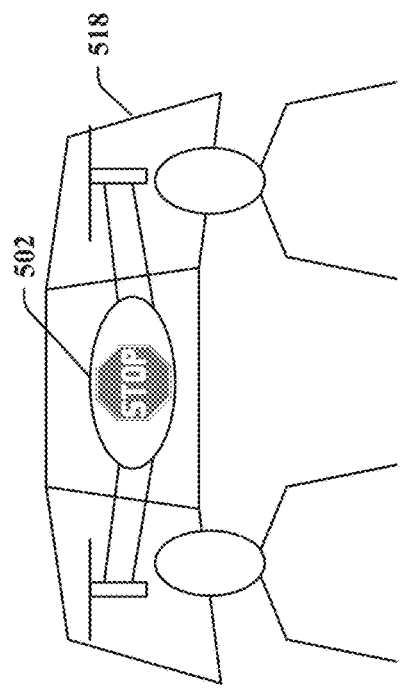
Figure 8C:
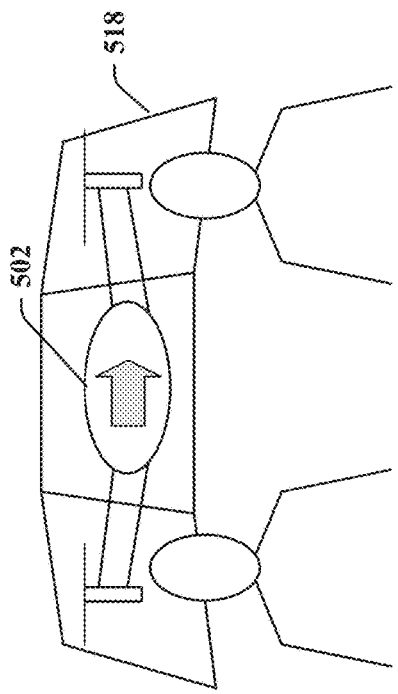
Figure 8D:
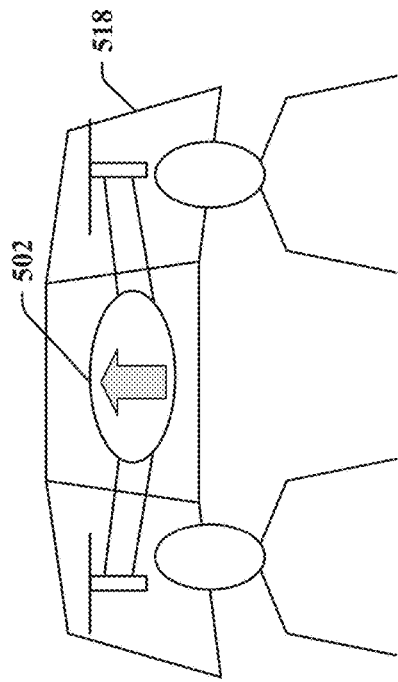
Figure 8E:
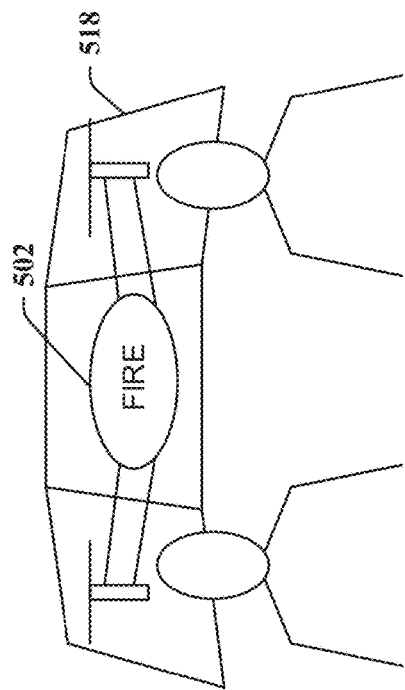
Figure 8F:
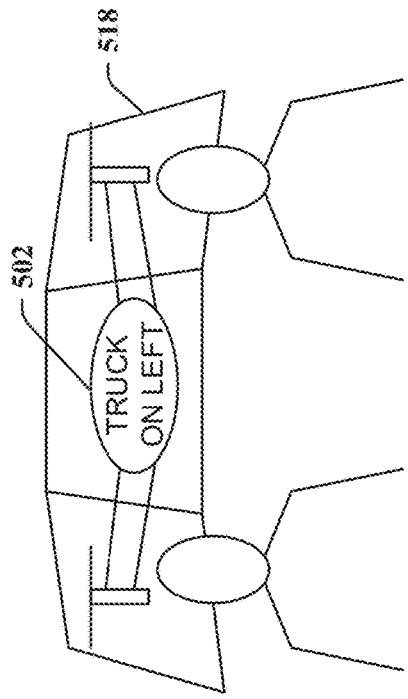
Figure 8G:
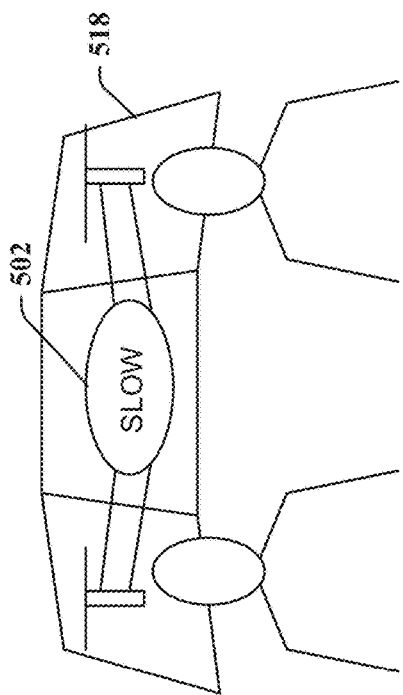
Figure 8H:
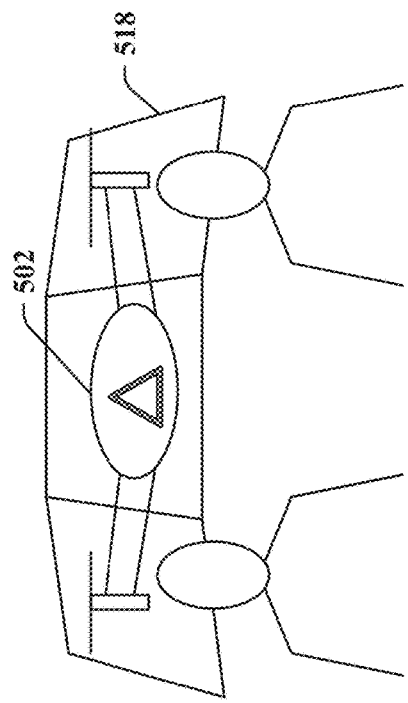

FIG. 8A illustrates drone device 502 with a display device displaying a right turn arrow to indicate that aircraft 518 should turn right. FIG. 8B illustrates drone device 502 with an indicator panel with fixed indicators for left turn arrow, forward arrow, right turn arrow, and stop, where the left turn arrow is lit up to indicate that aircraft 518 should turn left. FIG. 8C illustrates drone device 502 with a display device displaying a forward arrow to indicate that aircraft 518 should move forward. FIG. 8D illustrates drone device 502 with a display device displaying a stop sign to indicate that aircraft 518 should stop. FIG. 8E illustrates drone device 502 with a display device displaying the text "SLOW" to indicate that aircraft 518 should move at a slower speed. FIG. 8F illustrates drone device 502 with a display device displaying the text "FIRE" to indicate that a fire is on or near aircraft 518. It is to be appreciated the drone device 502 with a display device can display additional text or images to provide more information to the crew regarding the fire. FIG. 8G illustrates drone device 502 with a display device displaying the international symbol for warning to indicate a warning to the crew of aircraft 518. FIG. 8H illustrates drone device 502 with a display device displaying the text "TRUCK ON LEFT" to indicate that aircraft 518 is near a truck and that the truck is located to the left of aircraft 518. Indication component 612 can display any suitable text and/or images on a display device relating to the determined one or more determined hazards. It is to be appreciated that any suitable language can be employed by indication component 612 for displaying text, such as for example, based upon language of indication recipient.

It is to be appreciated that drone device 502 can provide indications using any suitable instrument(s) 510 to any recipient(s) using any suitable type of information relating to guiding an aircraft 518 and avoiding hazards, with any suitable level of detail using any suitable language, any suitable graphics, any suitable symbol standard, any suitable sounds, any suitable projections, any suitable communication, and any other suitable indications.

While FIGS. 5 and 6 depict separate components in drone device 502, it is to be appreciated that two or more components can be implemented in a common component. Further, it is to be appreciated that the design of the drone device 502 can include other component selections and/or component placements to facilitate guiding aircraft along ground movement paths of an airport and/or reducing the likelihood of or avoiding hazards. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed may be performed by specialized computers for carrying out defined tasks related to guiding aircraft along ground movement paths of an airport and avoiding hazards. The subject computer processing systems, methods apparatuses and/or computer program products can be employed to solve new problems that arise through advancements in technology, computer networks, the Internet and the like. The subject computer processing systems, methods apparatuses and/or computer program products can provide technical improvements to systems for guiding aircraft along ground movement paths of an airport and avoiding hazards by improving processing efficiency among processing components in these systems, reducing delay in processing performed by the processing components, and improving the accuracy in which the processing systems guide aircraft along ground movement paths of an airport and avoid hazards.

The embodiments of devices described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect) described herein, components described herein can examine the entirety or a subset of the data to which it is granted access and can provide for reasoning about or determine states of the system, environment, etc. from a set of observations as captured via events and/or data. Determinations can be employed to identify a specific context or action, and/or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 9:
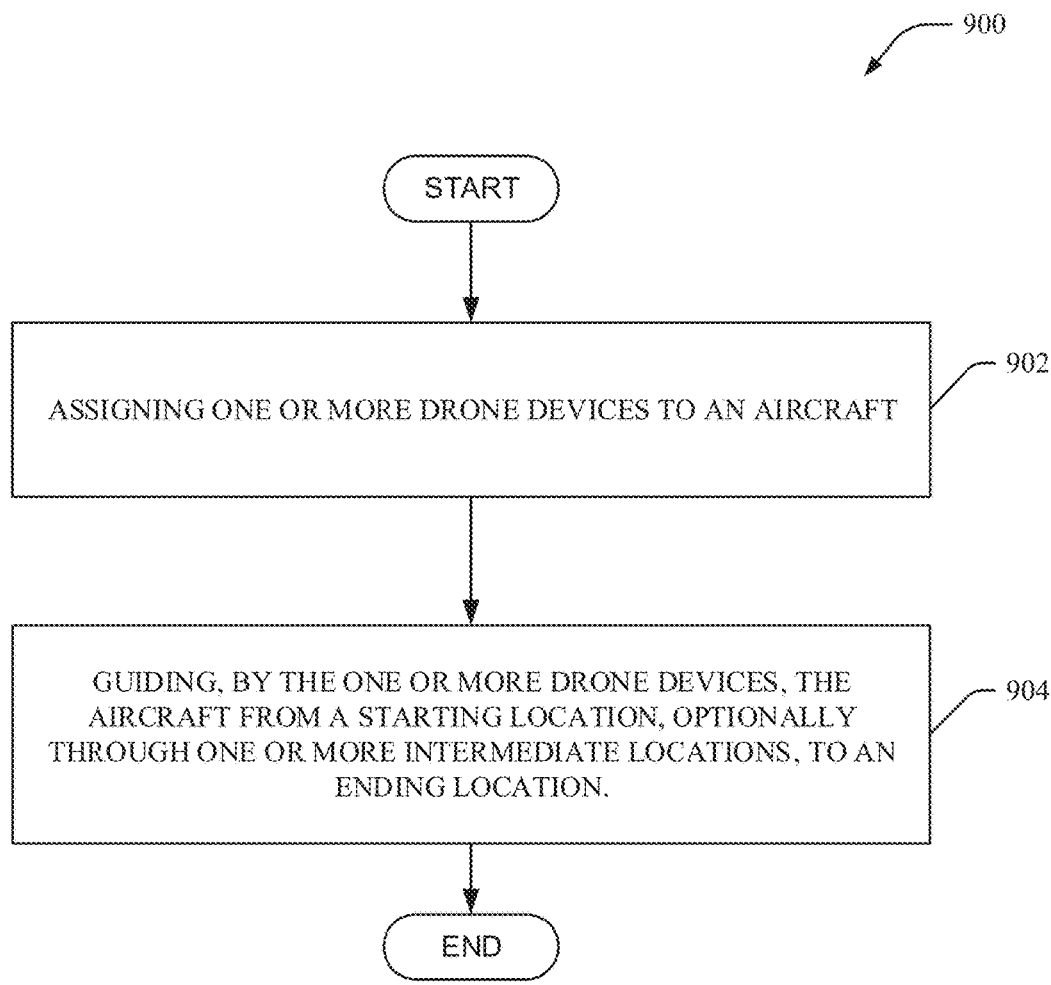
FIG. 9 illustrates a flow diagram of an example, non-limiting computer-implemented method that facilitates one or more drone devices guiding aircraft along ground movement paths of an airport in accordance with one or more embodiments described herein.

FIG. 9 illustrates a flow diagram of an example, non-limiting computer-implemented method 900 that facilitates one or more drone devices guiding aircraft along ground movement paths of an airport in accordance with one or more embodiments described herein. Repetitive description of like elements employed in other embodiments described herein is omitted for sake of brevity.

At 902, a drone device can determine an assignment of an aircraft to the drone device (e.g., via drone device 502, guidance component 504, and/or assignment component 602). At 904, the drone device can guide the aircraft to traverse a ground movement path from a starting location to an ending location (e.g., via drone device 502, guidance component 504, path selection component 604, aircraft matching component 606, hazard detection component 608, hazard response component 610, and/or indication component 612). The ground movement path can also optionally include one or more intermediate locations between the starting location and the ending location in some embodiments.

Figure 10:
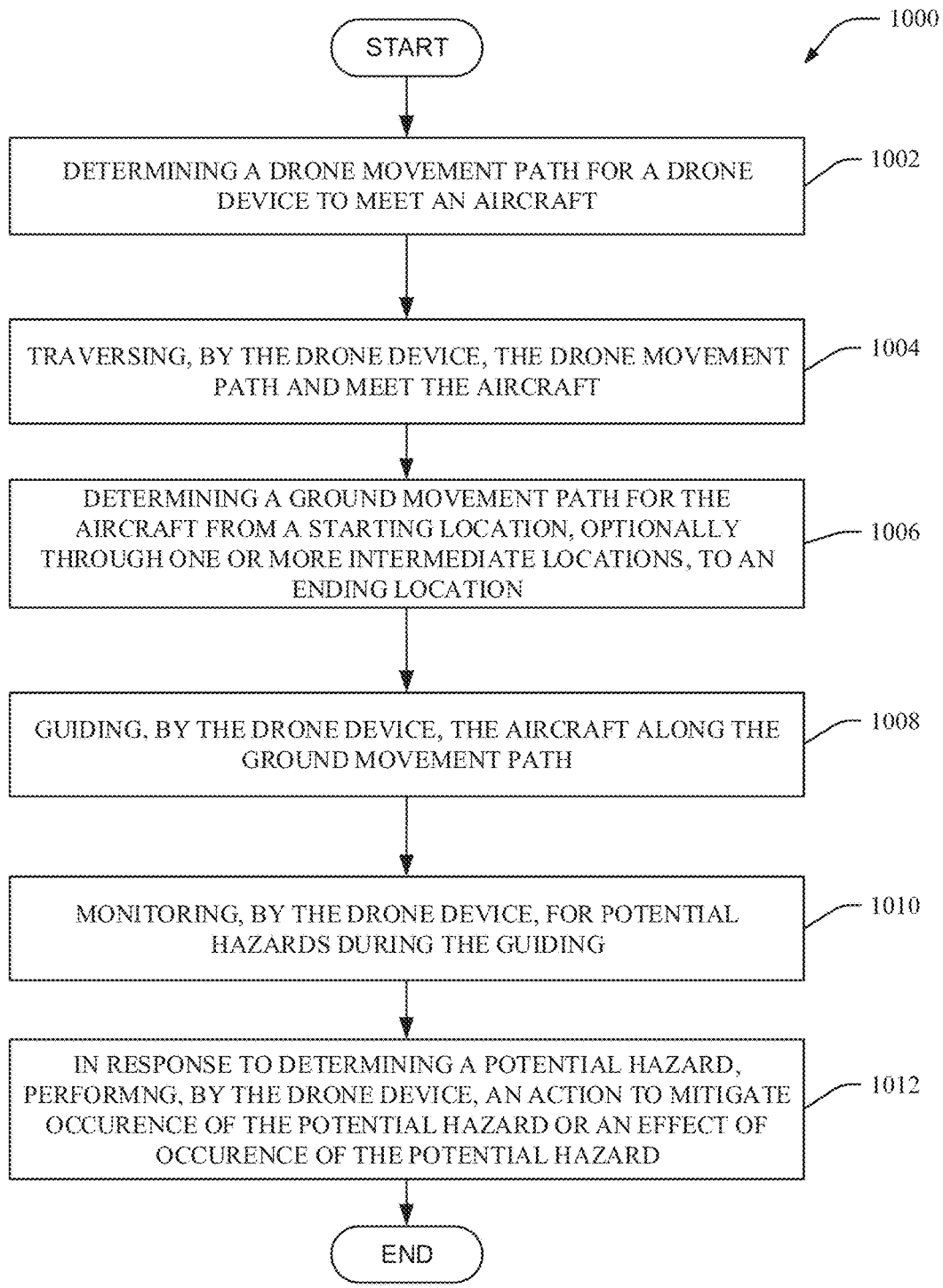
FIG. 10 illustrates a flow diagram of an example, non-limiting computer-implemented method that facilitates one or more drone devices guiding an aircraft in accordance with one or more embodiments described herein.

FIG. 10 illustrates a flow diagram of an example, non-limiting computer-implemented method 1000 that facilitates one or more drone devices guiding an aircraft in accordance with one or more embodiments described herein. Repetitive description of like elements employed in other embodiments described herein is omitted for sake of brevity.

At 1002, a drone device movement path can be determined for the drone device to traverse from a current location or a future location of the drone device to the starting location (e.g., via drone device 502, guidance component 504, and/or path selection component 604). At 1004, the drone device can traverse the drone device movement path to the ending location and meet the aircraft (e.g., via drone device 502, guidance component 504, path selection component 604, aircraft matching component 606, hazard detection component 608, hazard response component 610, and/or indication component 612).

At 1006, a ground movement path can be determined for the aircraft to traverse from the starting location, optionally through one or more intermediate locations, to an ending location (e.g., via drone device 502, guidance component 504, and/or path selection component 604). At 1008, the drone device can guide the aircraft along the ground movement path (e.g., via drone device 502, guidance component 504, path selection component 604, aircraft matching component 606, hazard detection component 608, hazard response component 610, and/or indication component 612).

At 1010, the drone device can monitor for potential hazards during the guiding the aircraft along the ground movement path (e.g., via drone device 502, guidance component 504, path selection component 604, aircraft matching component 606, hazard detection component 608, hazard response component 610, and/or indication component 612). At 1012, the drone device, in response to determining a hazard, can perform an action to mitigate occurrence of the hazard or an effect of occurrence of the hazard (e.g., via drone device 502, guidance component 504, path selection component 604, aircraft matching component 606, hazard detection component 608, hazard response component 610, and/or indication component 612).

Figure 11:
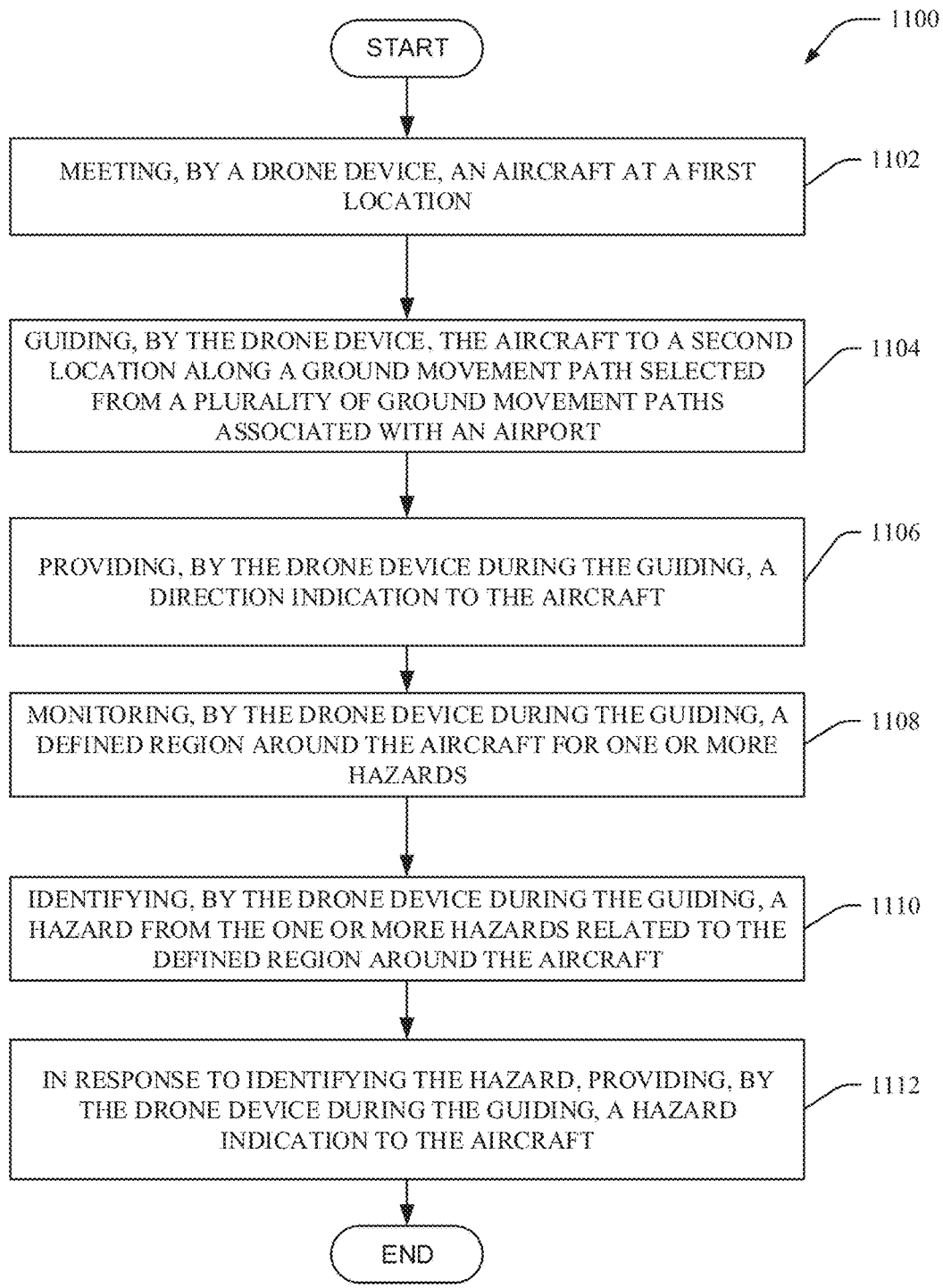
FIG. 11 illustrates a flow diagram of an example, non-limiting computer-implemented method that facilitates one or more drone devices guiding an aircraft in accordance with one or more embodiments described herein.

FIG. 11 illustrates a flow diagram of an example, non-limiting computer-implemented method 1000 that facilitates one or more drone devices guiding an aircraft in accordance with one or more embodiments described herein. Repetitive description of like elements employed in other embodiments described herein is omitted for sake of brevity.

At 1102, a drone device can meet an aircraft at a first location (e.g., via drone device 502, guidance component 504, and/or path selection component 604). At 1104, the drone device can guide the aircraft to a second location along a ground movement path selected from a plurality of ground movement paths associated with an airport (e.g., via drone device 502, guidance component 504, path selection component 604, aircraft matching component 606, hazard detection component 608, hazard response component 610, and/or indication component 612).

In some embodiments, although not shown, the guiding can include, but is not limited to, providing a direction indication to the aircraft (e.g., via drone device 502, guidance component 504, hazard response component 610, and/or indication component 612); monitoring a defined region around the aircraft for one or more hazards (e.g., via drone device 502, guidance component 504, and/or hazard detection component 608) and identifying a hazard from the one or more hazards related to the defined region around the aircraft (e.g., via drone device 502, guidance component 504, and/or hazard detection component 608). In some embodiments, in response to determining the hazard, the drone device can provide a hazard indication to the aircraft (e.g., via drone device 502, guidance component 504, hazard response component 610, and/or indication component 612).

Figure 12:
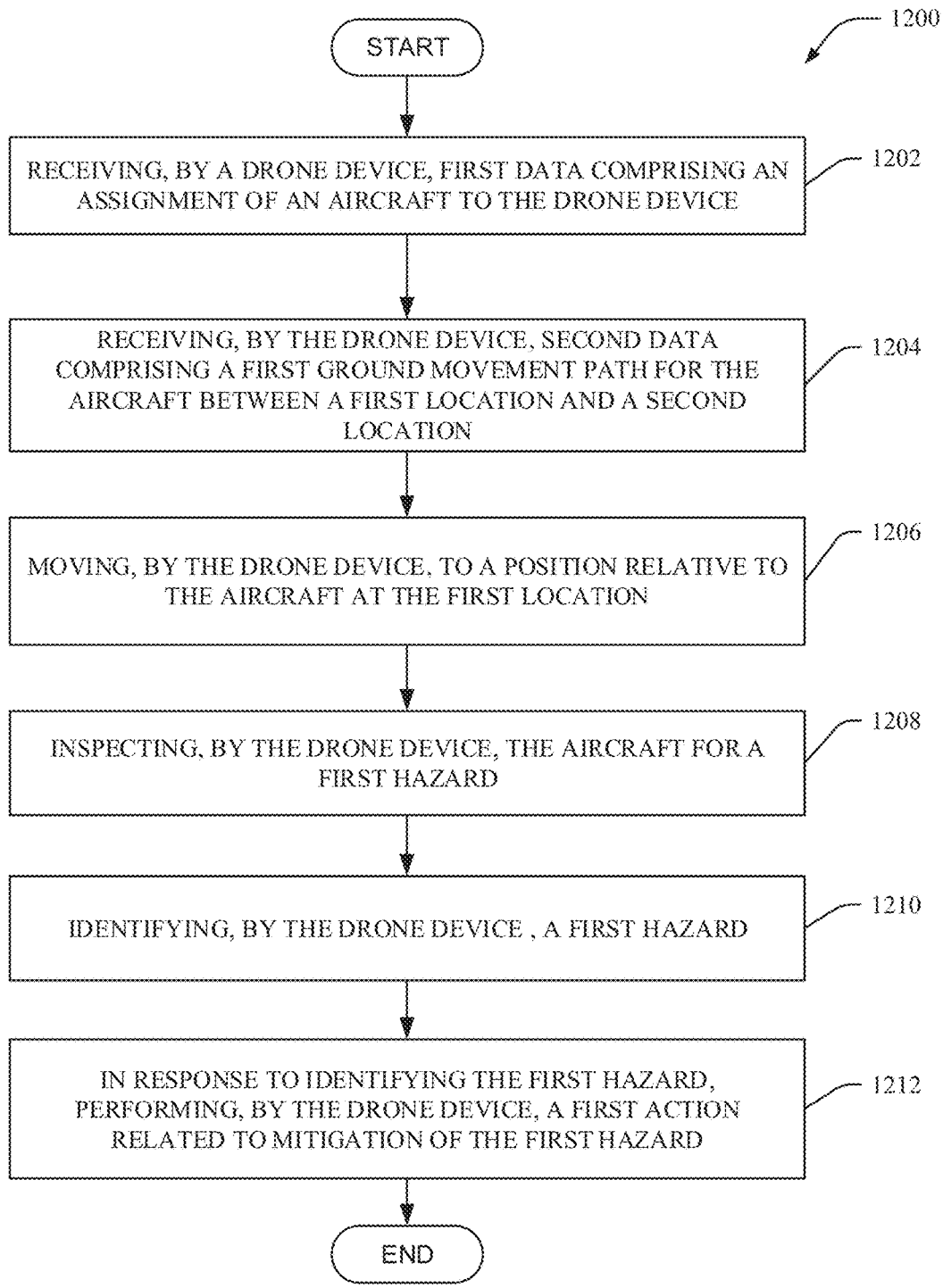
FIG. 12 illustrates a flow diagram of an example, non-limiting computer-implemented method that facilitates one or more drone devices inspecting an aircraft for hazards in accordance with one or more embodiments described herein.

FIG. 12 illustrates a flow diagram of an example, non-limiting computer-implemented method 1000 that facilitates one or more drone devices inspecting an aircraft for hazards in accordance with one or more embodiments described herein. Repetitive description of like elements employed in other embodiments described herein is omitted for sake of brevity.

At 1202, first data comprising an assignment of an aircraft to a drone device can be received by the drone device (e.g., via drone device 502, guidance component 504, assignment component 602, and/or communication component 506). At 1204, second data comprising a first ground movement path for the aircraft between a first location and a second location can be received by the drone device (e.g., via drone device 502, guidance component 504, path selection component 604, and/or communication component 506). At 1206, the drone device can move to a position relative to the aircraft at the first location (e.g., via drone device 502 and/or guidance component 504). At 1208, the aircraft can be inspected by the drone device for a first hazard (e.g., via drone device 502, guidance component 504, aircraft matching component 606, and/or hazard detection component 608). At 1210, the drone device, in response to determining the first hazard, can perform a first action related to mitigation of the first hazard (e.g., via drone device 502, guidance component 504, hazard response component 610, and/or indication component 612).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 13:
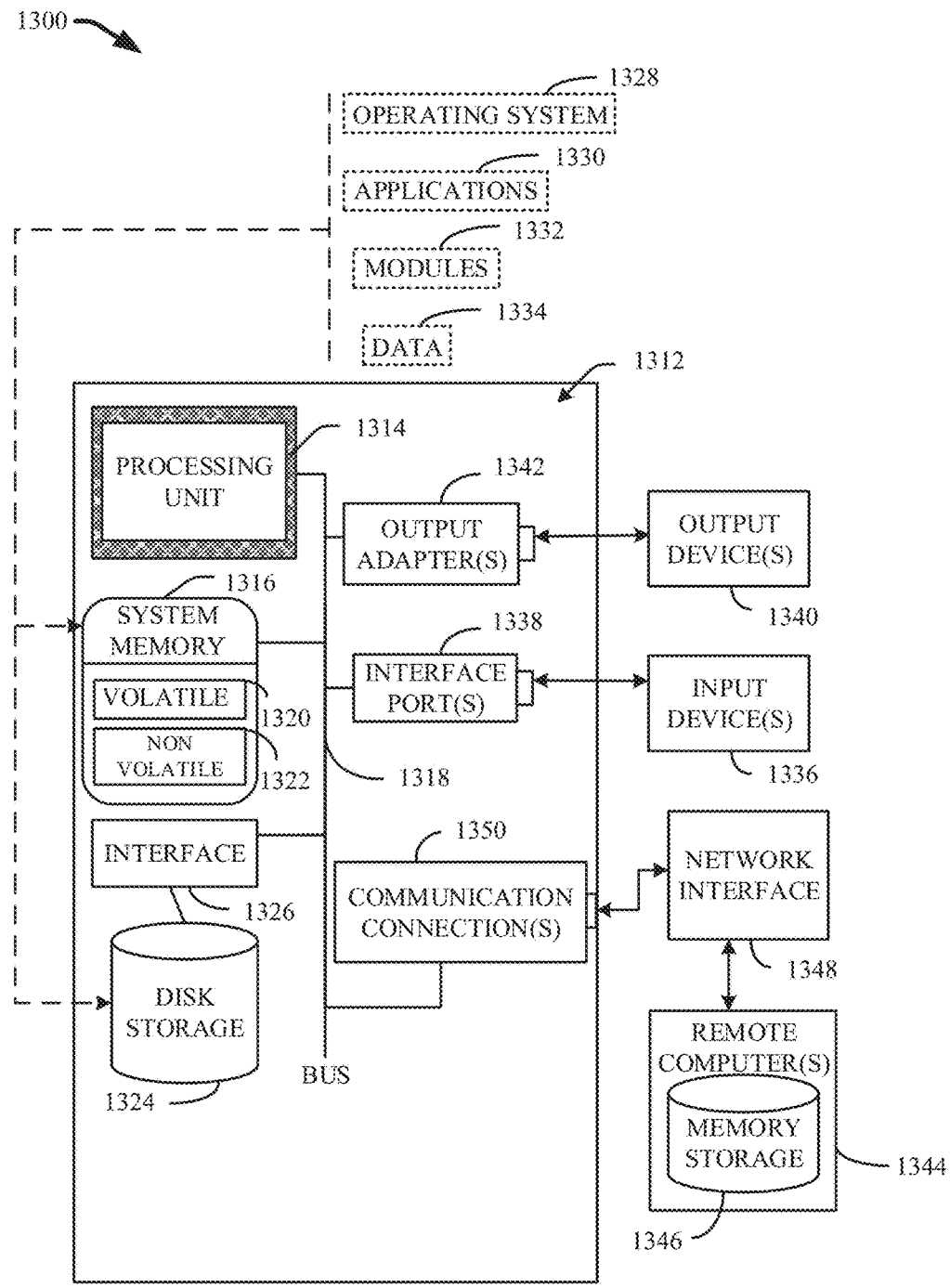
FIG. 13 illustrates a block diagram of an example, non-limiting operating environment in which one or more embodiments described herein can be facilitated.

In order to provide a context for the various aspects of the disclosed subject matter, FIG. 13 as well as the following discussion are intended to provide a general description of a suitable environment in which the various aspects of the disclosed subject matter can be implemented. FIG. 13 illustrates a block diagram of an example, non-limiting operating environment in which one or more embodiments described herein can be facilitated. Repetitive description of like elements employed in other embodiments described herein is omitted for sake of brevity. With reference to FIG. 13, a suitable operating environment 1300 for implementing various aspects of this disclosure can also include a computer 1312. The computer 1312 can also include a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314. The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1316 can also include volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1320 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1312 can also include removable/non-removable, volatile/nonvolatile computer storage media. FIG. 13 illustrates, for example, a disk storage 1324. Disk storage 1324 can also include, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1324 to the system bus 1318, a removable or non-removable interface is typically used, such as interface 1326. FIG. 13 also depicts software that acts as an intermediary between users and the basic computer resources described in the suitable operating environment 1301. Such software can also include, for example, an operating system 1328. Operating system 1328, which can be stored on disk storage 1324, acts to control and allocate resources of the computer 1312. System applications 1330 take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems. A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port can be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a computer, a server, a router, a network PC, a workstation, a microprocessor based appliance, a peer device or other common network node and the like, and typically can also include many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1350 refers to the hardware/software employed to connect the network interface 1348 to the system bus 1318. While communication connection 1350 is shown for illustrative clarity inside computer 1312, it can also be external to computer 1312. The hardware/software for connection to the network interface 1348 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   meeting, by a drone device operatively coupled to a processor, an aircraft at a first location; and
   guiding, by the drone device, the aircraft to a second location along a ground movement path selected from a plurality of ground movement paths associated with an airport, wherein the guiding comprises:
   providing a direction indication to the aircraft;
   monitoring a defined region around the aircraft for one or more hazards; and
   in response to identifying a hazard on the aircraft from the one or more hazards related to the defined region around the aircraft;
   providing a hazard indication to the aircraft, and
   employ, by the drone device, a tool of the drone device to eliminate the hazard.

2. The computer-implemented method of claim 1, wherein the direction indication comprises a visual indication.

3. The computer-implemented method of claim 1, wherein the hazard indication comprises a visual indication.

4. The computer-implemented method of claim 1, wherein the hazard indication comprises an audio indication.

5. The computer-implemented method of claim 1, wherein the monitoring is performed using an instrument coupled to the drone device.

6. The computer-implemented method of claim 1, wherein the monitoring comprises communicating with at least one other drone device of a plurality of drone devices communicating on a network.

7. The computer-implemented method of claim 1, further comprising:
   in response to identifying the hazard, transmitting, by the drone device, a hazard notification message to at least one recipient.

8. The computer-implemented method of claim 1, receiving assignment information that comprises an aircraft identification number and location information associated with the first location, and wherein the meeting further comprising:
   traversing to the first location and determining that an identification marking on an exterior surface of the aircraft matches the aircraft identification number.

9. The computer-implemented method of claim 1, wherein the meeting further comprises:
   identifying a safe path from a current location of the drone device to the first location, and traversing the safe path to the first location.

10. A drone device, comprising:
    a memory that stores computer executable components; and
    a processor that executes the computer executable components stored in the memory, wherein the computer executable components comprise:
    an assignment component that determines an assignment of an aircraft to the drone device;
    a guidance component that causes the drone device to perform a first action to guide the aircraft to traverse a ground movement path from a starting location to an ending location;
    a hazard detection component that determines a hazard on the aircraft during traversal along the ground movement path; and
    a hazard response component that causes the drone device to perform a second action comprising employment of a tool of the drone device to eliminate the hazard.

11. The drone device of claim 10, wherein the guidance component further comprises a path selection component that determines a drone device movement path for the drone device to traverse from a first location to a second location associated with the starting location.

12. The drone device of claim 10, wherein the hazard detection component further causes the drone device to move to a position relative to the aircraft at the first location and inspect the aircraft for the hazard.

13. The drone device of claim 10, wherein the hazard response component further causes the drone device to perform a third action to provide a hazard indication to the aircraft.

14. The drone device of claim 13, wherein the third action is to move the drone device in a pattern that provides an indication relating to the hazard.

15. The drone device of claim 14, wherein the first action is an action that prompts a crew member of the aircraft to cause the aircraft to proceed in an indicated direction.

16. The drone device of claim 15, wherein the indicated direction is associated with the ground movement path.

17. A computer program product for guiding an aircraft, the computer program product comprising a computer readable storage medium having program instructions embodied therewith, the program instructions executable by a drone device to cause the drone device to:
    receive first data comprising an assignment of an aircraft to the drone device;
    receive second data comprising a first ground movement path for the aircraft between a first location and a second location;
    move to a position relative to the aircraft at the first location;
    inspect the aircraft for a first hazard; and
    in response to identification of the first hazard on the aircraft, perform a first action related to mitigation of the first hazard, wherein the first action comprises employing a tool of the drone device to eliminate the first hazard.

18. The computer program product of claim 17, wherein the program instructions are further executable by the drone device to cause the drone device to:
    direct a guidance indication to the aircraft related to the ground movement path.

19. The computer program product of claim 17, wherein the program instructions are further executable by the drone device to cause the drone device to:
    monitor the ground movement path for a second hazard; and
    in response to identification of the second hazard, perform a second action related to mitigation of the second hazard.

20. The computer program product of claim 19, wherein the program instructions are further executable by the drone device to cause the drone device to:
    perform the second action, wherein the second action comprises determination of a second ground movement path from a current location of the aircraft to the second location, wherein the second ground movement path is different from a portion of the first ground movement path that spans from the current location of the aircraft to the second location.

* * * * *